(12) United States Patent
Knapp

(10) Patent No.: US 8,179,787 B2
(45) Date of Patent: May 15, 2012

(54) FAULT TOLERANT NETWORK UTILIZING BI-DIRECTIONAL POINT-TO-POINT COMMUNICATIONS LINKS BETWEEN NODES

(75) Inventor: David J. Knapp, Austin, TX (US)

(73) Assignee: SMSC Holding S.A.R.L., Grand-Duchy of Luxembourg (LU)

( * ) Notice: Subject to any disclaimer, the term of this patent is extended or adjusted under 35 U.S.C. 154(b) by 385 days.

(21) Appl. No.: 12/360,467

(22) Filed: Jan. 27, 2009

(65) Prior Publication Data

US 2010/0188972 A1 Jul. 29, 2010

(51) Int. Cl.
*G01R 31/08* (2006.01)
*H04L 12/28* (2006.01)

(52) U.S. Cl. ........................... 370/222; 370/258
(58) Field of Classification Search .......... 370/216–228, 370/242–258
See application file for complete search history.

(56) References Cited

U.S. PATENT DOCUMENTS

| | | | | |
|---|---|---|---|---|
| 5,299,046 A | 3/1994 | Spaeth et al. | ............... | 359/154 |
| 6,016,038 A | 1/2000 | Mueller et al. | ............... | 315/291 |
| 6,067,595 A * | 5/2000 | Lindenstruth | ............... | 710/307 |
| 6,150,774 A | 11/2000 | Mueller et al. | ............... | 315/291 |
| 6,234,645 B1 | 5/2001 | Börner et al. | ............... | 362/231 |
| 6,234,648 B1 | 5/2001 | Börner et al. | ............... | 362/235 |
| 6,250,774 B1 | 6/2001 | Begemann et al. | ............... | 362/231 |
| 6,384,545 B1 | 5/2002 | Lau | ............... | 315/292 |
| 6,396,815 B1 * | 5/2002 | Greaves et al. | ............... | 370/256 |
| 6,498,440 B2 | 12/2002 | Stam et al. | ............... | 315/291 |
| 6,513,949 B1 | 2/2003 | Marshall et al. | ............... | 362/231 |
| 6,617,795 B2 | 9/2003 | Bruning | ............... | 315/151 |
| 6,636,003 B2 | 10/2003 | Rahm et al. | ............... | 315/179 |
| 6,664,744 B2 | 12/2003 | Dietz | ............... | 315/291 |
| 6,692,136 B2 | 2/2004 | Marshall et al. | ............... | 362/231 |
| 6,788,011 B2 | 9/2004 | Mueller et al. | ............... | 315/294 |
| 6,806,659 B1 | 10/2004 | Mueller et al. | ............... | 315/295 |
| 6,831,569 B2 | 12/2004 | Wang et al. | ............... | 340/825.52 |
| 6,853,150 B2 | 2/2005 | Clauberg et al. | ............... | 315/185 |
| 6,879,263 B2 | 4/2005 | Pederson et al. | ............... | 340/815.45 |
| 6,969,954 B2 | 11/2005 | Lys | ............... | 315/155 |

(Continued)

FOREIGN PATENT DOCUMENTS

JP 06-302384 10/1994
(Continued)

OTHER PUBLICATIONS

B. Hall et al., "*Jet Engine Control Using Ethernet with a Brain (Postprint),*" Postprint of the 44th AIAA/ASME/SAE/ASEE Joint Propulsion Conference and Exhibition, Jul. 2008, See Section II.G.

(Continued)

*Primary Examiner* — Kwang B Yao
*Assistant Examiner* — Tung Q Tran
(74) *Attorney, Agent, or Firm* — Keven L. Daffer; Daffer McDaniel, LLP

(57) ABSTRACT

A data communication system and an associated network node implementation is disclosed that, in certain embodiments, uses single-channel bi-directional communication links between nodes to send frames of data. The network nodes can be connected together in a ring or daisy chain topology with data frames sent in alternating directions through the bi-directional links. Such networks initially configured in a physical ring topology can tolerate single point failures by automatically switching to a logical daisy chain topology.

21 Claims, 15 Drawing Sheets

Message and Acknowledge Diagram

U.S. PATENT DOCUMENTS

| | | | | |
|---|---|---|---|---|
| 6,975,079 | B2 | 12/2005 | Lys et al. | 315/292 |
| 7,014,336 | B1 | 3/2006 | Ducharme et al. | 362/231 |
| 7,038,399 | B2 | 5/2006 | Lys et al. | 315/291 |
| 7,046,160 | B2 | 5/2006 | Pederson et al. | 340/815.45 |
| 7,072,587 | B2 | 7/2006 | Dietz et al. | 398/138 |
| 7,135,824 | B2 | 11/2006 | Lys et al. | 315/292 |
| 7,161,311 | B2 | 1/2007 | Mueller et al. | 315/294 |
| 7,233,115 | B2 | 6/2007 | Lys | 315/291 |
| 7,233,831 | B2 | 6/2007 | Blackwell | 700/17 |
| 7,252,408 | B2 | 8/2007 | Mazzochette et al. | 362/294 |
| 7,255,458 | B2 | 8/2007 | Ashdown | 362/246 |
| 7,256,554 | B2 | 8/2007 | Lys | 315/291 |
| 7,358,706 | B2 | 4/2008 | Lys | 323/222 |
| 7,372,859 | B2 | 5/2008 | Hall et al. | 370/400 |
| 7,606,451 | B2 | 10/2009 | Morita | 385/24 |
| 2002/0049933 | A1* | 4/2002 | Nyu | 714/43 |
| 2003/0122749 | A1 | 7/2003 | Booth, Jr. et al. | 345/82 |
| 2004/0052076 | A1 | 3/2004 | Mueller et al. | 362/293 |
| 2005/0004727 | A1 | 1/2005 | Remboski et al. | 701/36 |
| 2005/0110777 | A1 | 5/2005 | Geaghan et al. | 345/179 |
| 2005/0200292 | A1 | 9/2005 | Naugler, Jr. et al. | 315/149 |
| 2006/0164291 | A1 | 7/2006 | Gunnarsson | 342/51 |
| 2006/0227085 | A1 | 10/2006 | Boldt, Jr. et al. | 345/83 |
| 2007/0132592 | A1 | 6/2007 | Stewart et al. | 340/572.8 |
| 2007/0139957 | A1 | 6/2007 | Haim et al. | 362/600 |
| 2008/0107029 | A1* | 5/2008 | Hall et al. | 370/235 |
| 2008/0222367 | A1* | 9/2008 | Co | 711/149 |
| 2008/0265799 | A1 | 10/2008 | Sibert | 315/292 |
| 2008/0297070 | A1 | 12/2008 | Kuenzler et al. | 315/308 |
| 2008/0309255 | A1 | 12/2008 | Myers et al. | 315/297 |
| 2009/0049295 | A1* | 2/2009 | Erickson et al. | 713/2 |
| 2009/0196282 | A1* | 8/2009 | Fellman et al. | 370/352 |
| 2009/0245101 | A1* | 10/2009 | Kwon et al. | 370/226 |
| 2010/0061734 | A1 | 3/2010 | Knapp | 398/128 |
| 2010/0188972 | A1 | 7/2010 | Knapp | 370/226 |
| 2010/0272437 | A1* | 10/2010 | Yoon et al. | 398/54 |
| 2010/0327764 | A1 | 12/2010 | Knapp | 315/250 |
| 2011/0044343 | A1* | 2/2011 | Sethuram et al. | 370/395.51 |
| 2011/0062874 | A1 | 3/2011 | Knapp | 315/158 |
| 2011/0063214 | A1 | 3/2011 | Knapp | 345/158 |
| 2011/0063268 | A1 | 3/2011 | Knapp | 345/207 |
| 2011/0068699 | A1 | 3/2011 | Knapp | 315/158 |
| 2011/0069094 | A1 | 3/2011 | Knapp | 345/690 |
| 2011/0069960 | A1 | 3/2011 | Knapp | 389/103 |

FOREIGN PATENT DOCUMENTS

| | | |
|---|---|---|
| JP | 11-025822 | 1/1999 |
| JP | 2001-514432 | 9/2001 |
| JP | 2007-266974 | 10/2007 |

OTHER PUBLICATIONS

A. Kebemou, "*A Partitioning-Centric Approach for the Modeling and the Methodical Design of Automotive Embedded System Architectures,*" Dissertation of Technical University of Berlin, 2008, See Section 2.2.3.

D. O'Brien et al., *Visible Light Communications and Other Developments in Optical Wireless,* Wireless World Research Forum, 2006.

J. Zalewski et al., "*Safety Issues in Avionics and Automotive Databuses,*" IFAC World Congress, Jul. 4, 2005.

Project IEEE P802.15 Working Group for Wireless Personal Area Networks (WPANs), "*Visible Light Communication; Tutorial,*" Mar. 9, 2008.

PCT/US2010/000219, "*International Search Report,*" dated Oct. 12, 2010.

PCT/US2010/002171, "*International Search Report,*" dated Nov. 24, 2010.

PCT/US2010/004953, "*International Search Report,*" dated Mar. 22, 2010.

PCT/US2010/001919, "*International Search Report,*" dated Feb. 24, 2011.

U.S. Appl. No. 12/924,628, "*LED Transceiver Front End Circuitry and Related Methods,*" filed Sep. 30, 2010.

PCT/US2009/004953, "*International Preliminary Report on Patentability and Written Opinion,*" dated Mar. 8, 2011.

PCT/US2010/000219, "*Written Opinion of the International Searching Authority,*" dated Oct. 12, 2010.

PCT/US2010/001919, "*Written Opinion of the International Searching Authority,*" dated Feb. 24, 2011.

PCT/US2010/002171, "*Written Opinion of the International Searching Authority,*" dated Nov. 24, 2010.

\* cited by examiner

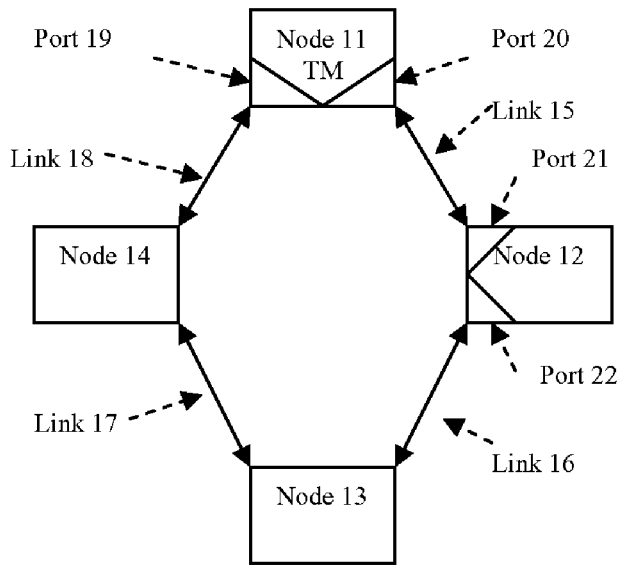
Figure 1A: Ring Network Diagram
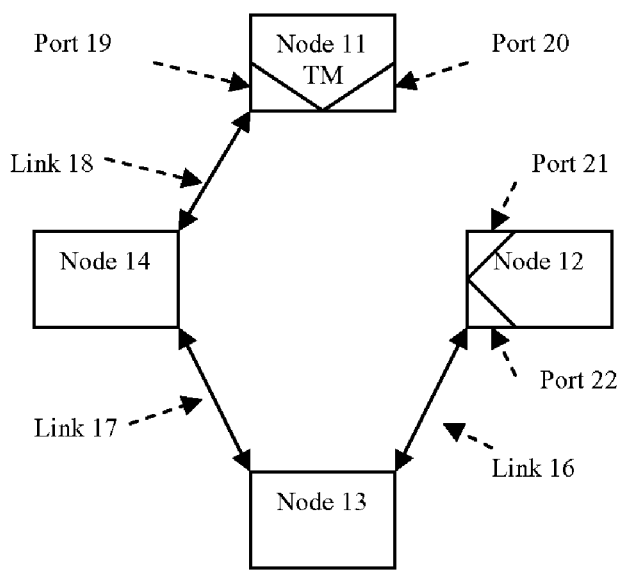
Figure 1B: Daisy Chain Network Diagram

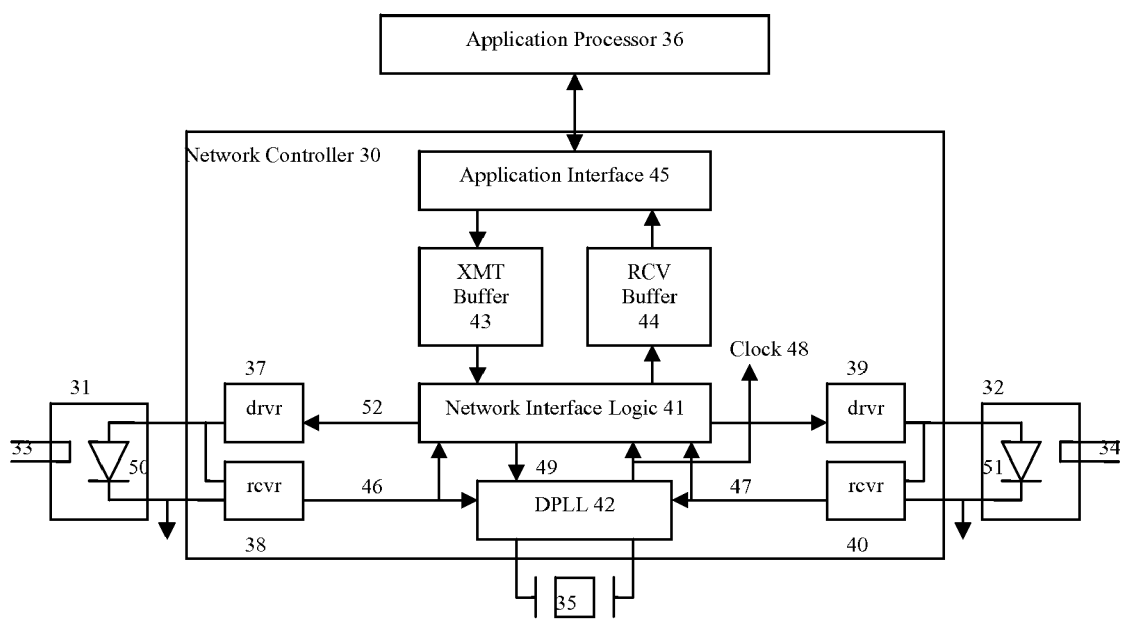
Figure 2: Node Block Diagram

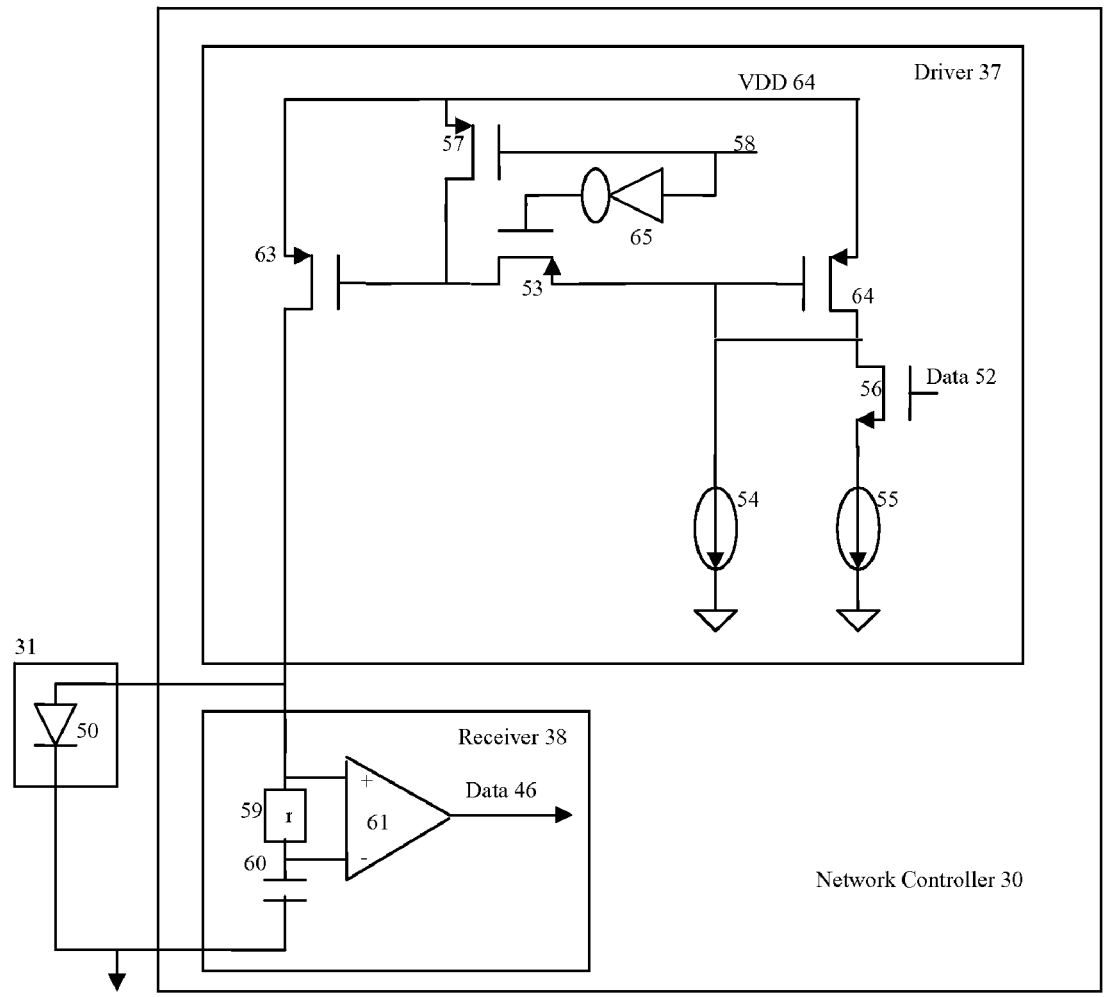
Figure 3: Driver and Receiver Circuitry
Data Frame 70
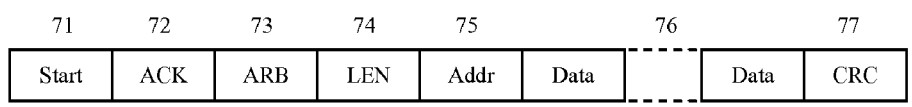
Figure 4: Data Frame Format

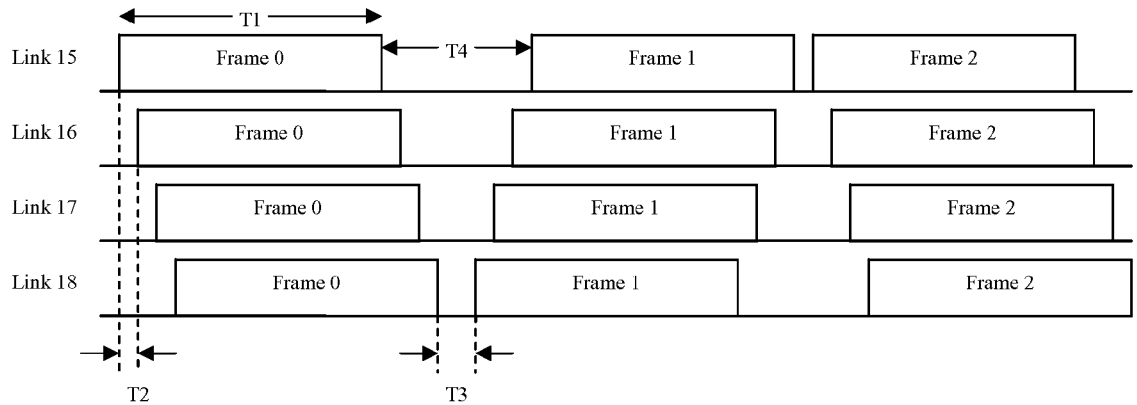
Figure 5A: Data Frame Timing in Ring
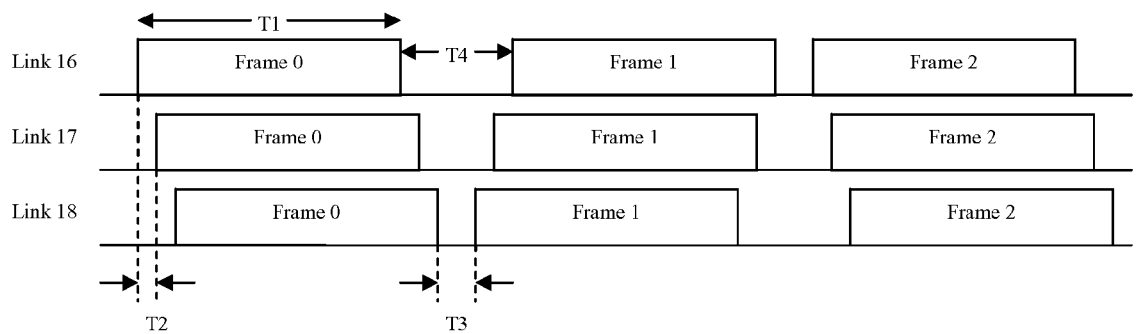
Figure 5B: Data Frame Timing in Daisy Chain

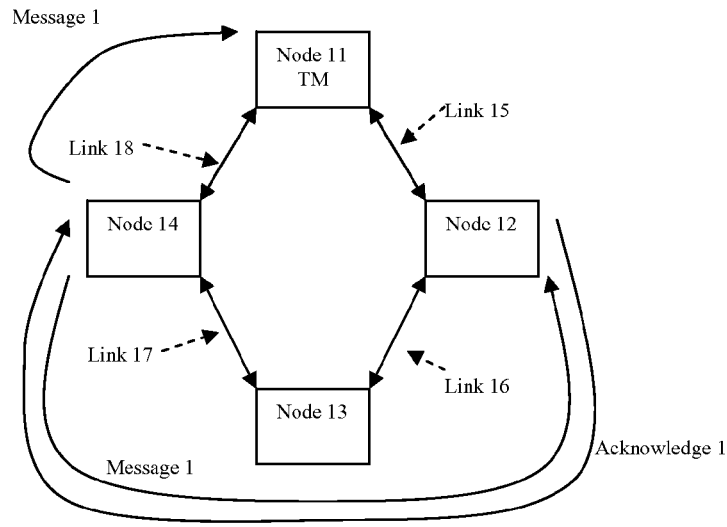
Figure 6A: Message and Acknowledge Diagram
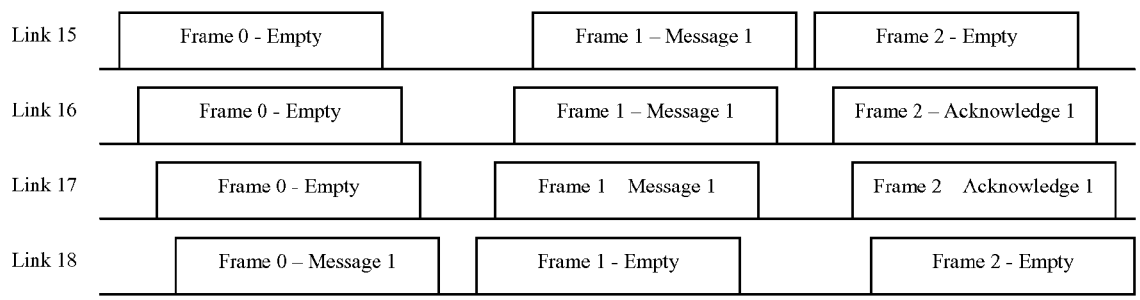
Figure 6B: Message and Acknowledge Timing

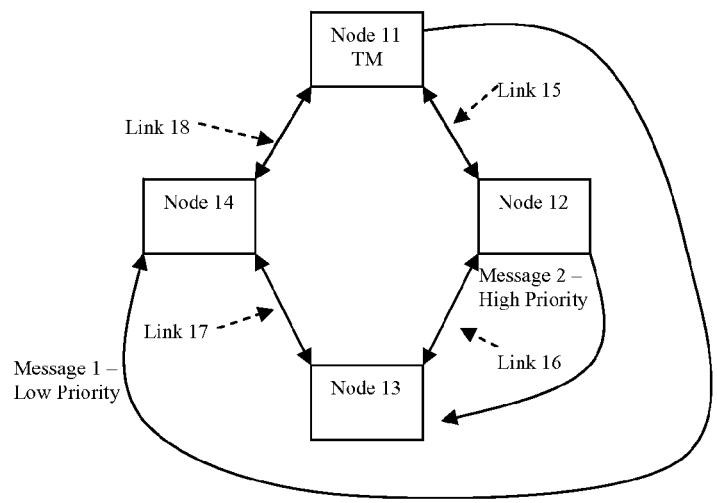
Figure 7A: Message Arbitration Diagram
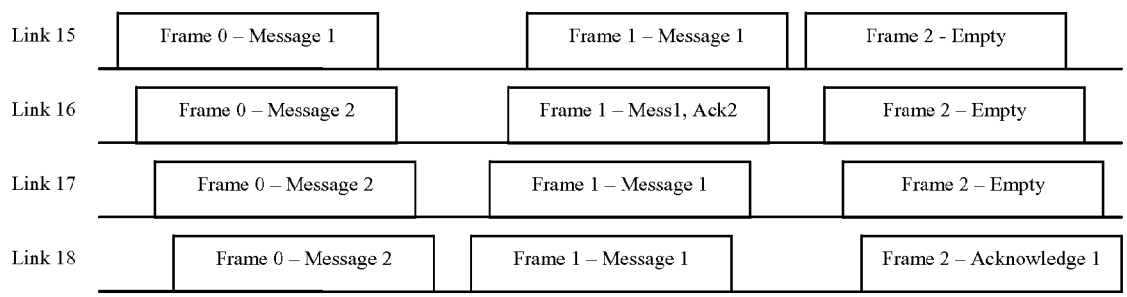
Figure 7B: Message Arbitration Timing

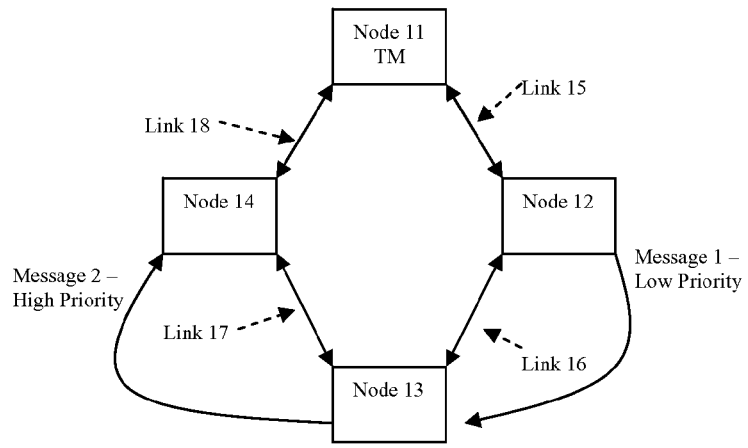
Figure 8A: Message Arbitration Diagram
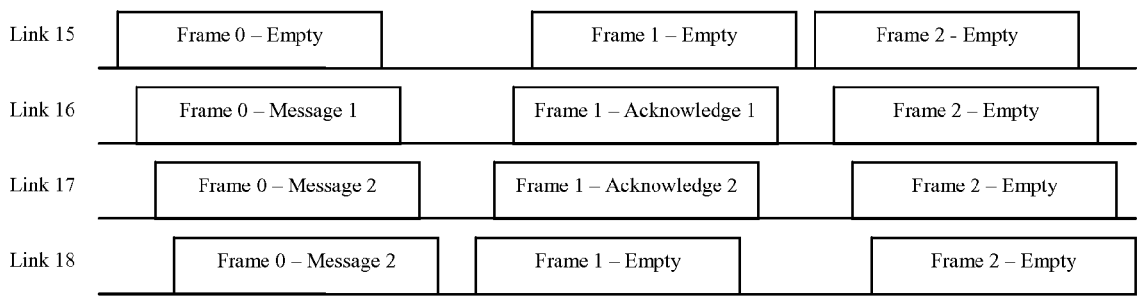
Figure 8B: Message Arbitration Timing

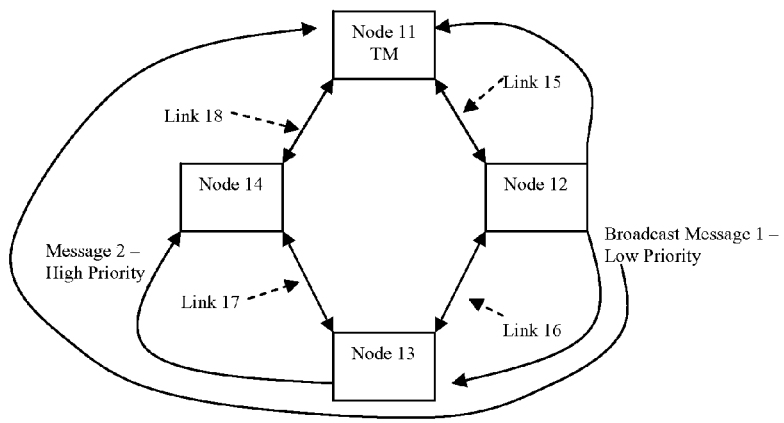
Figure 9A: Broadcast Message Diagram
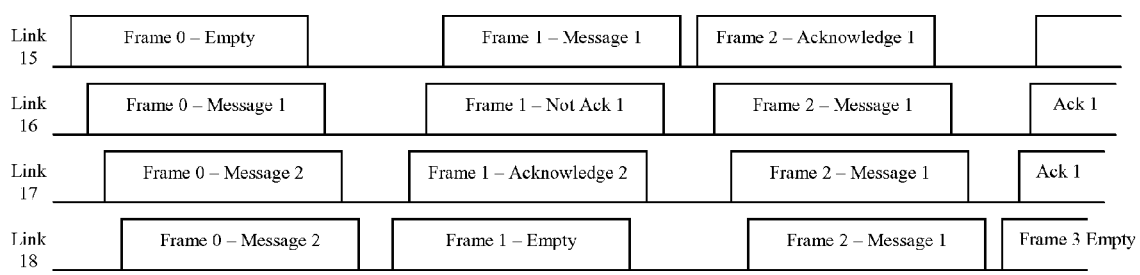
Figure 9B: Broadcast Message Timing

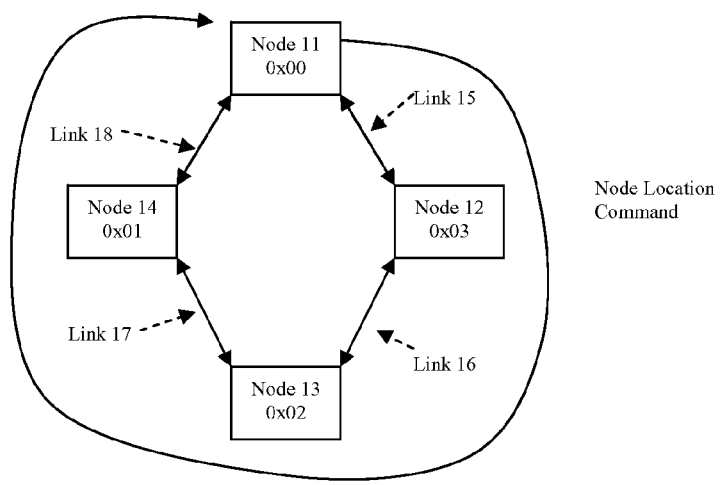
Figure 10A: Node Address Diagram in a Ring
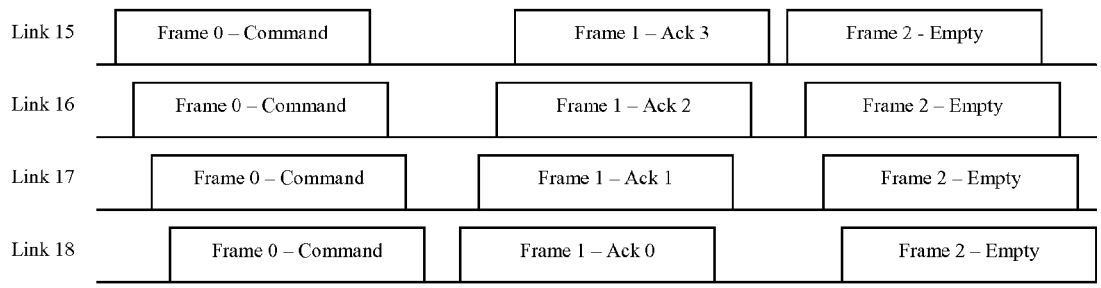
Figure 10B: Node Address Timing in a Ring

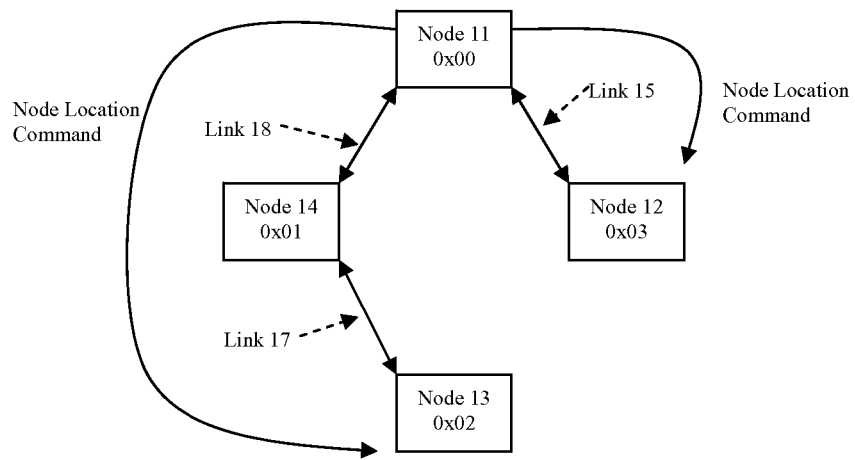
Figure 11A: Node Address Diagram in a Daisy Chain
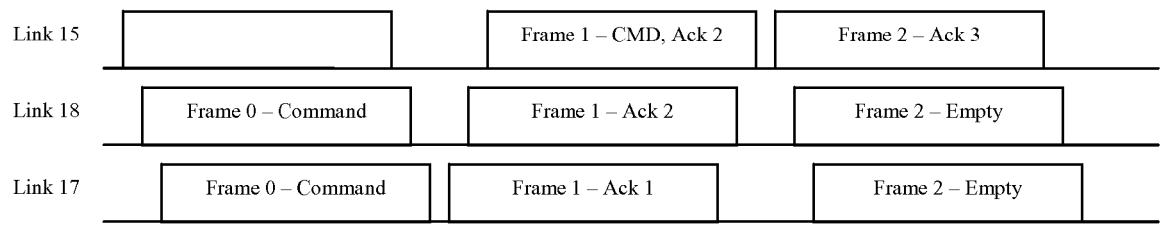
Figure 11B: Node Address Timing in a Daisy Chain

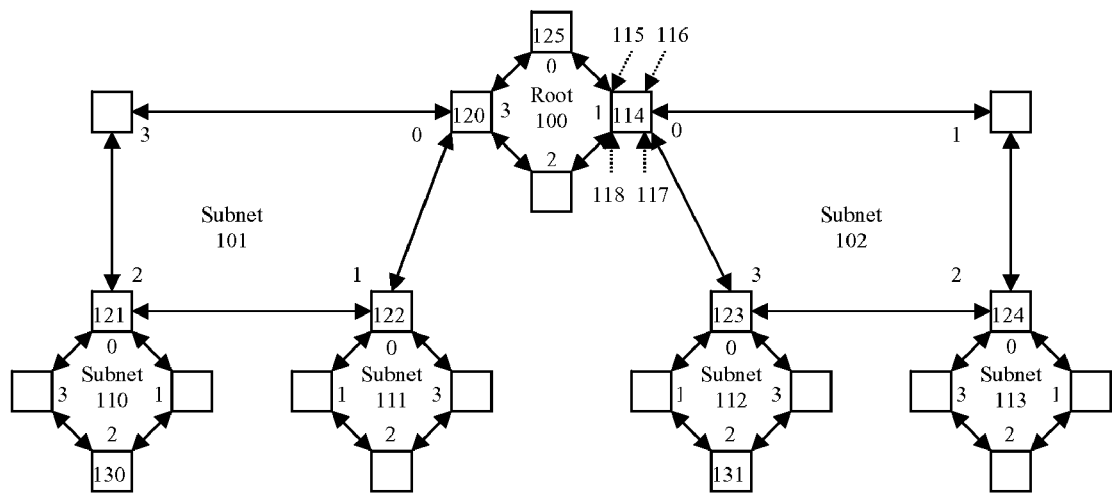
Figure 12A: Hierarchical Network
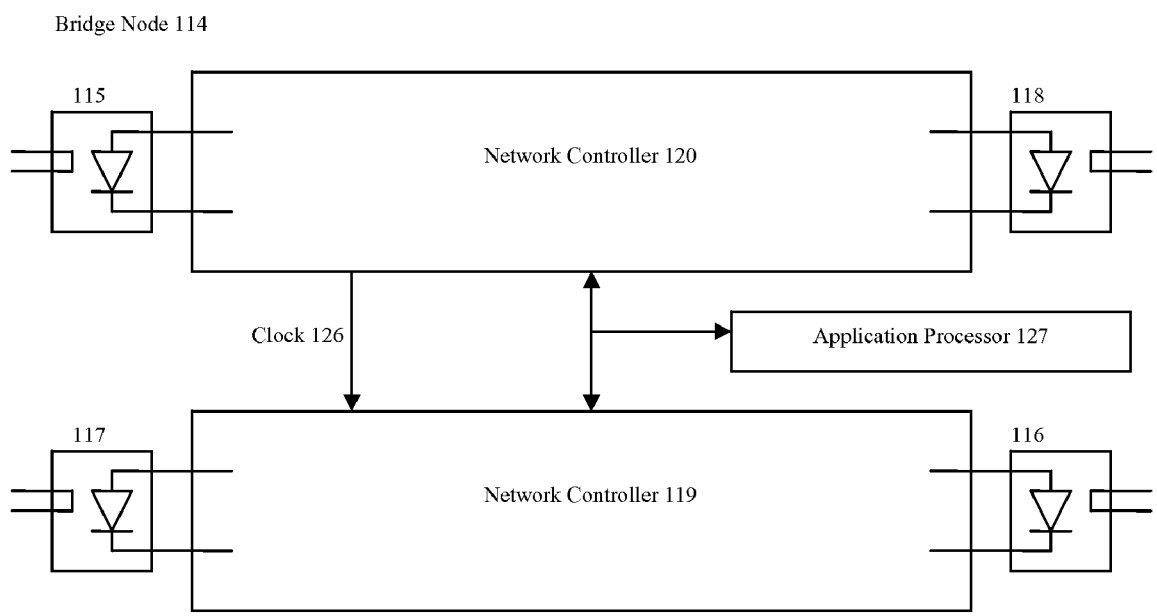
Figure 12B: Bridge Node Block Diagram

| Sending Node | Network | Address |
|---|---|---|
| 130 | Layer 2 Subnet 110 | 00.00.01.03.02 |
| 121 | Layer 1 Subnet 101 | 00.01.03.02 |
| 120 | Root Net 100 | 01.03.02 |
| 114 | Layer 1 Subnet 102 | 03.02 |
| 123 | Layer 2 Subnet 112 | 02 |

Figure 12C: Hierarchical Addressing

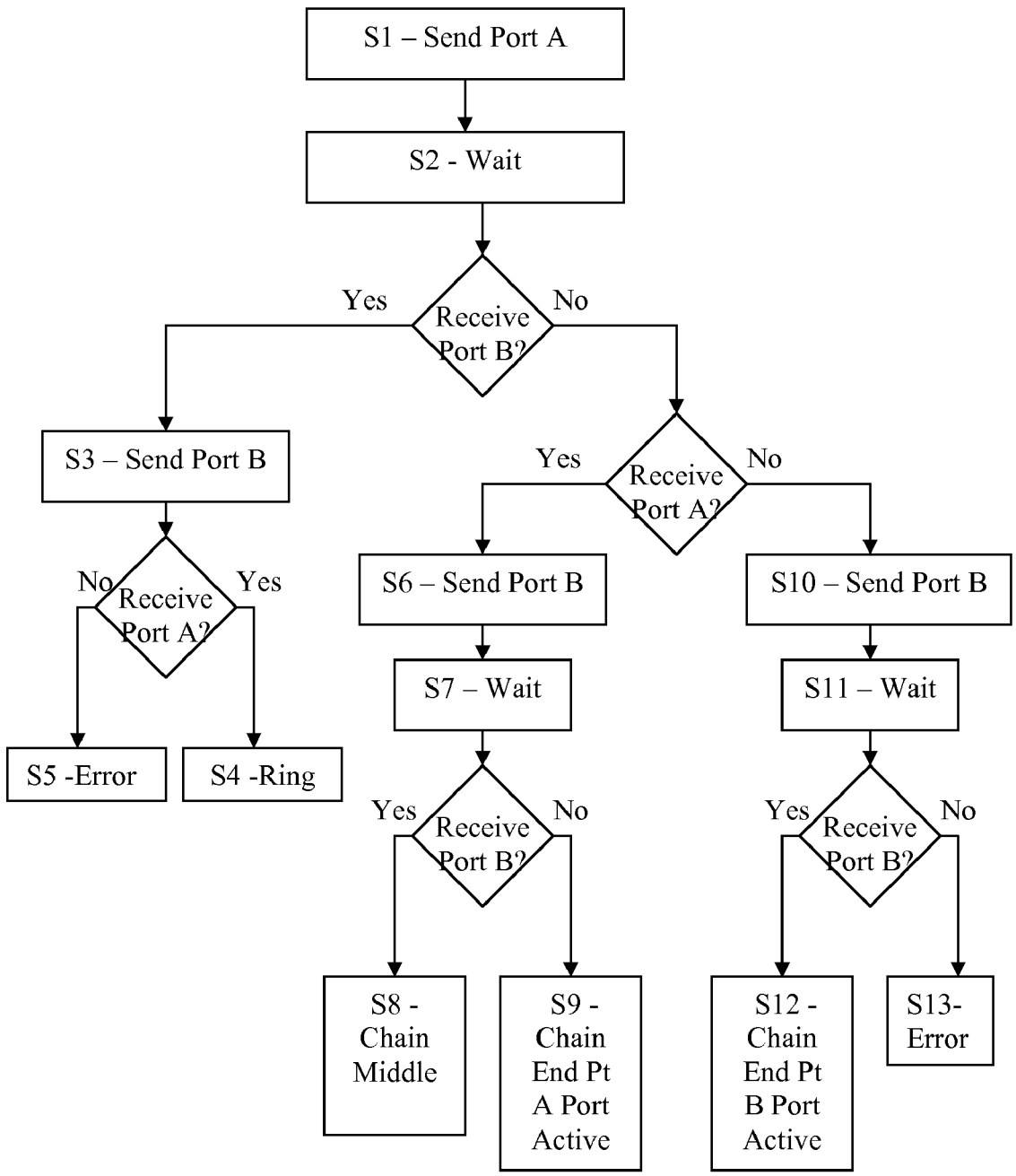
Figure 13A: Timing Master Initialization State Machine

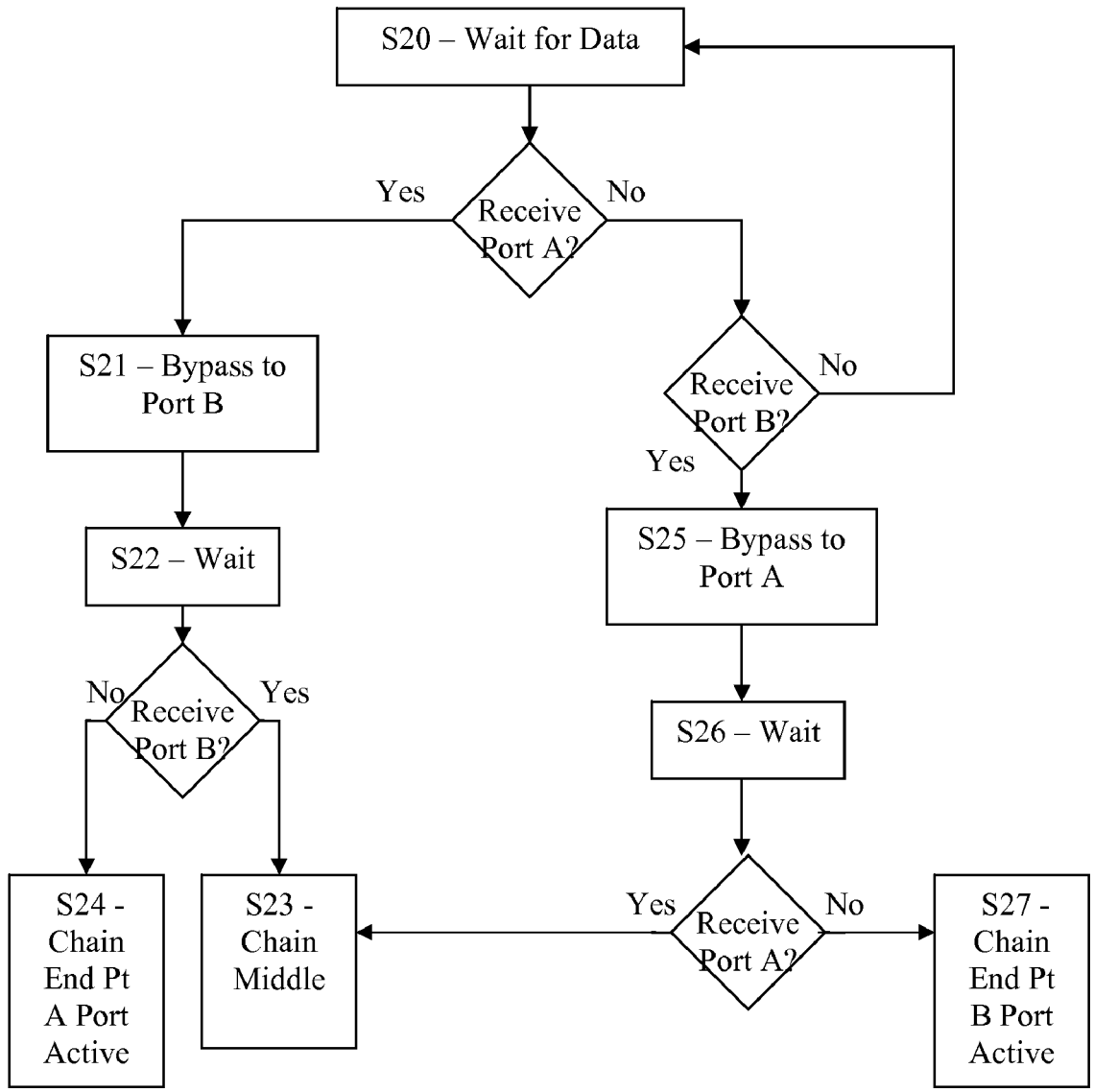
Figure 13B: Non-Timing Master Initialization State Machine

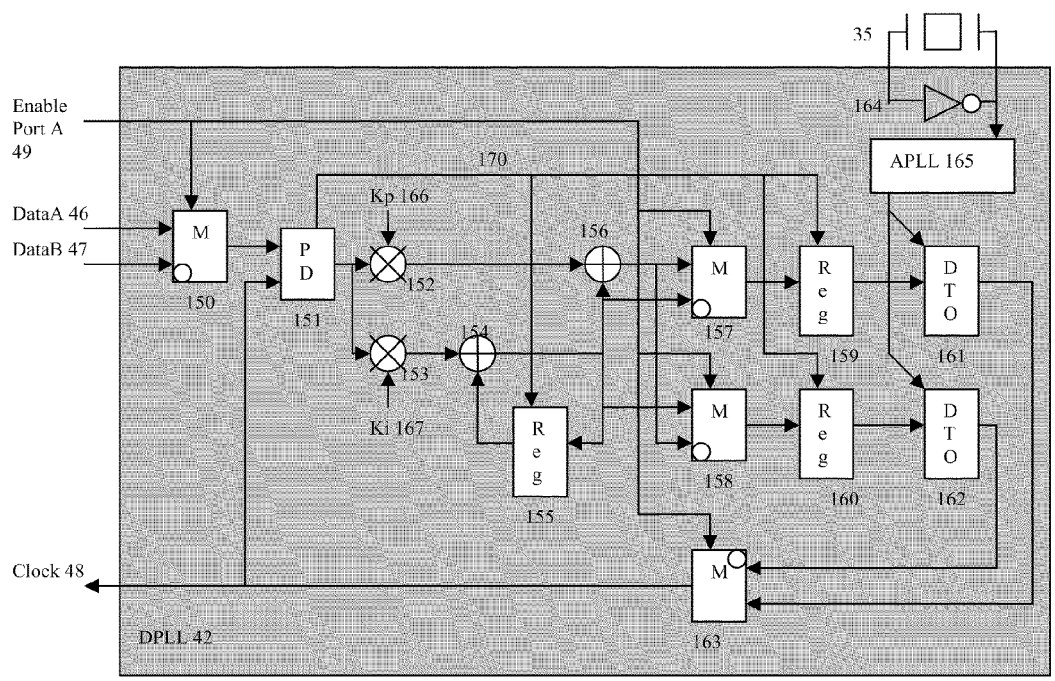
Figure 14: Digital PLL Block Diagram

FAULT TOLERANT NETWORK UTILIZING BI-DIRECTIONAL POINT-TO-POINT COMMUNICATIONS LINKS BETWEEN NODES

BACKGROUND

1. Field of the Invention

This invention relates to a data communication system that preferably uses bi-directional communication links between network nodes to send frames of data.

2. Description of the Related Art

Modern data communication networking can be traced back to at least the late 1950s and early 1960s with the introduction of the Telecommunication carrier or T-carrier system by Bell Labs for communicating digitized voice streams around the world. The personal computer revolution triggered the introduction of a variety of computer network technologies, including ARCNET, Token Ring, Ethernet, and FDDI, in the late 1970s and early 1980s, with Ethernet becoming the dominate computer networking protocol over time. As the demand for wide area data communication grew, the telecommunications industry responded in the late 1980s and early 1990s with the introduction of technologies such as SONET to carry the ever growing data traffic along with the traditional voice streams.

With the growth of personal computers in the early 1980s came the need to interconnect them with peripherals such as printers and modems, which lead to the standardization of PC serial and parallel ports. As the number and complexity of PC peripherals grew, protocols such as Universal Serial Bus (USB) from Intel and Firewire (IEEE 1394) from Apple were introduced in the middle 1990s to support the new functionality, such as Audio/Video (A/V) devices, and to reduce the number of connectors needed on a PC.

The need for real-time data communication networks for controlling components in automobiles came with the introduction of fuel injection systems in the early 1980s. Many car makers and suppliers responded with proprietary protocols, such as Control Area Network (CAN) from Germany, Vehicle Area Network (VAN) from France, and J1850 from the US, with CAN becoming the dominate control protocol over time.

During the early 1990s increasing demand for information and entertainment (infotainment) in vehicles with the associated increase in bandwidth and streaming capabilities lead to the development of protocols such as Multi-Media Link (MML) from Delphi and ST Microelectronics, and Media Oriented System Transport (MOST) from Oasis Siliconsystems and then SMSC. At the same time, Texas Instruments was promoting an automotive variant of IEEE 1394; however, over time MOST became the dominant protocol in the automotive infotainment market.

Although a wide variety of networking technologies from markets such as telecommunications, computer, and consumer electronics were available at the times, the automotive industry developed and selected unique networking technologies such as CAN and MOST due to special automotive requirements, such as robustness, performance, quality, and limited transmission distance. Many of the features and capabilities of networks such as CAN and MOST incorporated ideas from other markets, but fine tuned them for automotive applications. For instance, CAN uses the same shared bus topology as the original coaxial cable based Ethernet; however, arbitration was improved to make it more deterministic.

The latest automotive networking technology to be introduced is FlexRay, which has been developed and promoted by German and US car makers targeted at next generation "X by wire" applications. These applications refer to systems such as braking and steering being controlled by digital communications instead of traditional mechanics and hydraulics. Such a system needs high throughput and low latency, and must be deterministic and fault tolerant. The FlexRay protocol achieves these requirements, but at significant cost, since redundant cabling provides the fault tolerance.

The FlexRay topology is based on a redundant active star. All nodes have 2 ports, which connect to 2 different active stars, which then connect to all other nodes providing single point fault tolerance. Each link to the active star is single twisted pair wire capable of bi-directional communication and data sent from one node is broadcast to all nodes. The active star topology with bi-directional cabling and broadcast messaging is the same as the original ARCNET. The redundant star is new with FlexRay.

In the FlexRay protocol, the highest level in the communication timing hierarchy is a communication cycle that repeats at a fixed rate, which is preferably set by one timing reference. All other nodes have free running clocks that are periodically synchronized to the timing reference, which results in some jitter on the local network clocks. The communication cycle is divided in a static segment and a dynamic segment for communicating data frames. The static segment is time division multiplexed with each timeslot dedicated to a particular node for high priority deterministic communication. The dynamic segment provides shared bandwidth for lower priority, which is allocated in an implicit token ring manner to provide deterministic behavior.

Such fixed rate communication cycles with time division multiplexing dates back to the late 1950s with the introduction of T1. The concept of dividing the cycle into static and dynamic segments was seen as early as the early 1990s with introduction of Firewire and USB and may have existed early in the telecom market. FlexRay's way of dividing between static and dynamic segments, however, is closer to MOST than Firewire or USB. Something that appears to be new with FlexRay is the implicit token ring arbitration for the dynamic bandwidth.

FlexRay was developed for X-by-wire applications since other automotive networks such as CAN and MOST did not fulfill the necessary requirements for bandwidth and deterministic behavior (in the case of CAN), and fault tolerance (in the case of MOST). The CAN protocol typically uses a twisted pair cable shared by all nodes, which can send and receive messages, but not simultaneously. Messages are sent serially on the bus starting with an ID and are sensed by all nodes. If multiple nodes start sending at the same time, the message with the dominant ID wins arbitration and finishes sending the message. Other nodes with non-dominant IDs stop transmission until the dominate message has been sent. The CAN protocol has some fault protection in that if one of the two conductors are shorted to power or ground, communication over the other conductor is still possible. CAN is not appropriate for X-by-wire applications since the data rate is too low, less than 1 Mbit/sec, and there are no dedicated timeslots for high priority communication.

A MOST network typically uses a ring topology of unidirectional point to point links. The physical layer can be optical or twisted pair wire and supports data rates from 25-150 Mbits per second. Like a FlexRay communication cycle, a MOST frame repeats at a fixed rate and is divided into time division multiplexed fields for dedicated data sources and shared fields that all nodes can arbitrate for. Unlike FlexRay and advantageous to MOST, MOST nodes are synchronized by PLLs to the timing source node, which minimizes jitter on the local network clocks. Unlike FlexRay and advantageous to FlexRay, MOST did not provide any fault tolerance at the time. Unlike FlexRay and advantageous for some types of communication but not others, the time division multiplexed field of MOST only supported raw streaming data while the TDM fields of FlexRay only transport packets addressable to one or more destinations. Additionally, nodes arbitrate in a token ring manner for bandwidth in the dynamic segment of a FlexRay communication cycle, while MOST uses a message priority based arbitration scheme somewhat similar to CAN.

MOST, which was initially introduced with an optical physical layer, traces its roots to the telecom world of T1 and SONET (Synchronous Optical NETwork), which was first proposed to the standards organization ANSI in 1985. Like SONET, MOST has a ring topology with uni-directional point to point links and a repetitive frame structure that is time division multiplexed into a number of channels. In both SONET and MOST all nodes are precisely synchronized by PLLs at the bit level timing to a single timing reference, which is unlike any of the computer or computer peripheral networks mentioned except possibly for IBM's Token Ring, which is not time division multiplexed.

For both SONET and MOST, precisely synchronized clocks at all network nodes facilitate the transport of any data streaming from an analog to digital (A/D) converter at a source to a digital to analog (D/A) converter at a destination. Additionally, TDM channels dedicated to A/Ds synchronized to either the SONET or MOST bit timing provide a raw data transport mechanism with zero overhead.

Although both SONET and MOST can allocate one or more TDM channels for data packet communication, MOST has low level mechanisms, such as arbitration, acknowledgement, error detection, and system control, that are appropriate for local area networks but not the wide area telecommunications networks that SONET services. Although implemented differently, message arbitration and acknowledgement in MOST packet communication channels can be traced back to the early computer communication protocols such as ARCNET and IBM's Token Ring. The primary innovation of the automotive MOST protocol was the specific combination of particular ideas from the telecom and computer worlds to produce a simple and cost effective networking technology focused on the needs of the target automotive market.

Although MOST has plenty of bandwidth for X-by-wire applications and has the dedicated timeslots that provide guaranteed bandwidth, FlexRay was developed primarily because MOST did not provide fault tolerance at the time. Secondly, MOST's TDM channels communicate raw streaming data like SONET instead of packets like CAN. Just like with SONET, MOST could provide single point fault tolerance with a redundant communication channel traveling in the opposite direction of the main ring, however, like FlexRay, this doubles the cost of the physical layer.

SUMMARY

The present invention provides a fault tolerant network capable of supporting the existing applications serviced by MOST and CAN and the new applications of X-by-wire targeted by FlexRay without the prohibitive cost of duplicate cabling, which includes both the wiring and any necessary hubs or stars.

An improved data communication system in accordance with the present invention preferably uses single-channel bi-directional point-to-point links between nodes to send frames of data. The network nodes can be connected together in a ring or daisy chain topology with successive data frames sent in alternating directions through the bi-directional links. A network that is initially configured as a ring can re-configure to a daisy chain when a communication link or network node fails. Nodes adjacent to a faulty link or node can determine that a failure exists and trigger the network to re-configure. When the failing link or node recovers, the network can detect the change and revert back to the ring configuration.

When implemented with a digital phase locked loop (DPLL) for clock recovery, all nodes can operate synchronously to each other as in SONET and MOST, which eliminates the need for special "clock synchronization calculation schedules" as in FlexRay. The jitter on the local clocks synchronized to the network is similar to MOST and substantially lower than for FlexRay, which is advantageous for real time streaming applications such as audio and video.

In certain embodiments, the system has one timing master that provides the bit and frame timing for a ring or daisy chain, which is similar to protocols such as SONET, Token Ring, and MOST. The frame can be a fixed length as in SONET, MOST, and FlexRay or variable length as in Token Ring. Frames can repeat at a relatively high rate and include a single message, like Token Ring, or can repeat at a relatively low rate, be time division multiplexed, and include many messages or raw data streams like SONET, MOST, and FlexRay.

In certain embodiments in a ring configuration, the timing master sends a data frame from a first port, which travels around the ring and returns to the second port of the timing master. After the complete data frame has been received, the timing master sends a next data frame from the second port. This data frame travels back around the ring to the first port of the timing master. After the first port receives the entire data frame, the process repeats for successive data frames. Thus, successive data frames bounce back and forth between "end points" of the ring, which in a ring is preferably a single timing master node.

In a daisy chain configuration, the timing master may or may not be at an end point of the chain, but successive data frames nonetheless bounce back and forth between end points. If the timing master is an end point, the timing master sends a first frame from a first port, which travels along the daisy chain to a first port of the second end point. After the second end point receives the entire data frame, the second end point sends a second data frame from the first port back through the chain to the first port of the timing master. After the timing master receives the entire frame on the first port, the process repeats. Conversely, if the timing master is not an end point, the timing master receives on its first port a data frame launched by one end point, and simply retimes the frame to its local timing reference (e.g., crystal oscillator) and forwards the frame to its other port for transmission along the daisy chain to the other end point. Data frames continually bounce back and forth between end points, but the timing master only synchronizes the bit timing (for frames traveling in both directions). In certain embodiments the timing master also ensures that only one data frame is bouncing back and forth between end points at any given time. Messages are sent in the same manner as in a ring.

If the data frame includes just one message, such as in a network to replace CAN, a node that wins arbitration sends a message in a data frame traveling in the proper direction to a destination node. If the sender does not know the direction of the destination or is broadcasting a message, then the message is preferably sent in two frames traveling in opposite directions. If desired, a receiving node can send an acknowledgement back to the sending node in a second data frame traveling in the opposite direction of the message without interfering with any second message sent by any node in the second data frame.

If the data frame is time division multiplexed to provide a number of channels for messages, each channel can operate as just described for a single message data frame. Some channels can be dedicated to particular nodes to guarantee message bandwidth (as in the static segment of the FlexRay communication cycle) and some channels can be shared by many nodes (as in the dynamic segment of the FlexRay communication cycle.) Similarly, some channels can be dedicated to particular nodes to communicate raw streaming data instead of message like the MOST synchronous or isochronous channels. The data frame can be divided into the form that best suits the application.

The improved system makes use of the concept of sending data frames in opposite directions around a ring or through a daisy chain. Protocols such as SONET, Token Ring, FDDI, and MOST use a ring topology, however, data always travels in one direction through the interconnect. This is because unidirectional communication channels are simpler to build. Each node has a dedicated transmitter and a dedicated receiver, instead of two transceivers. In the case of optical interconnect, a transmitter typically uses an LED and a receiver uses a silicon photodiode, but cost effective optical transceivers may utilize a single LED for both transmit and receive, which helps provide for cost effective implementations using optical interconnect.

Clock and data recovery is also simpler for uni-directional links. Traditionally, analog PLLs lock to a continuous stream of data to produce a clock synchronous with the received data. Any times when received data is not transitioning the frequency of the analog voltage controlled oscillator (VCO) drifts due to parasitic circuit elements. The improved system preferably uses digital PLLs instead of analog PLLs that are much less susceptible to frequency drift and can tolerate much longer periods with no received data.

Protocols such Firewire and USB use a daisy chain or tree topology and in some variants (1394A) the communication channels between nodes are bi-directional. However, these protocols have a unique root node (i.e., Firewire) or a host (i.e., USB) that continually broadcast the frame timing on all ports to all nodes. Neither of these protocols utilize end points of a daisy chain alternately producing successive data frames.

Combining the new concepts for data frame communication in a ring and a daisy chain with the concept of detecting a faulty node or communication link in a ring and switching to a daisy chain provides embodiments that address the challenge facing the automotive industry for a cost effective deterministic fault tolerant communication system capable of supporting the growing number of applications in the automobile.

In one aspect the invention provides a method for use in a network node within an interconnected network of nodes. An exemplary method includes: forwarding data frames received on a first bi-directional port of the network node to a second bi-directional port of the network node for outbound transmission on the second bi-directional port; forwarding data frames received on the second bi-directional port to the first bi-directional port for outbound transmission on the first bi-directional port; and if a data frame received on a given bi-directional port includes a message addressed to the network node, then inserting a message status symbol into the next data frame transmitted outbound on the given bi-directional port.

In another aspect the invention provides a system comprising: a plurality of network nodes, each having at least two bi-directional ports capable of transmitting and receiving data frames; a plurality of bi-directional communication links connecting said plurality of network nodes in a physical topology which includes a serially-connected string of said network nodes; wherein said plurality of network nodes are configured to communicate successive data frames alternately in opposite directions from node to node along the string.

In yet another aspect the invention provides a method of communicating information in a system comprising a network topology including a string of serially-connected network nodes, each node including respective first and second ports. An exemplary method includes: launching successive data frames alternately from a first port of a first network node to travel in one direction along the string of network nodes until the first data frame either reaches a second port of the first network node, or reaches an end node of the string of network nodes, and then from either the second port of the first network node or from the end node to travel in the other direction along the string of network nodes to reach the first port of the first network node; and inserting a first message into a first data frame received on the first port of a source node and forwarding the first data frame on the second port of the source node toward downstream nodes.

In still another aspect the invention provides a network node device for use in a system of interconnected network nodes. An exemplary network node device includes: a first port configured to interface with a bi-directional communication link for transmitting and receiving data frames to a first external device connected thereto; a second port configured to interface with a bi-directional communication link for transmitting and receiving data frames to a second external device connected thereto; first circuitry for synchronizing an associated internal clock to data frames received on the first port, and for forwarding such first-port received data frames to the second port for transmission; second circuitry for synchronizing an associated internal clock to data frames received on the second port, and for forwarding such second-port received data frames to the first port for transmission; and third circuitry for inserting a message into a data frame passing from one port to the other port through the device in either direction.

In yet another aspect the invention provides a network node device for use in a system of interconnected network nodes. An exemplary network node device is configured to: forward data frames received on one of first and second bi-directional ports for outbound transmission on the other of said first and second bi-directional ports; and insert, if a data frame received on the first bi-directional port includes a message addressed to the network node device, a message status symbol into the next data frame transmitted outbound on the first bi-directional port.

The foregoing is a summary and thus contains, by necessity, simplifications, generalizations and omissions of detail. Consequently, those skilled in the art will appreciate that the foregoing summary is illustrative only and that it is not intended to be in any way limiting of the invention. Other aspects, inventive features, and advantages of the present invention, as defined solely by the claims, may be apparent from the detailed description and accompanying drawings of the embodiments described below.

BRIEF DESCRIPTION OF THE DRAWINGS

Other objects and advantages of the invention will become apparent upon reading the following detailed description and upon reference to the accompanying drawings in which:

FIGS. 1A and 1B are network diagrams of a ring network with no faults and of the resulting daisy chain network when a communication link in a ring fails.

FIG. 2 is an exemplary block diagram of a network node including a network interface controller and associated support circuitry.

FIG. 3 is an exemplary circuit diagram for an optical transceiver.

FIG. 4 is an exemplary data frame format.

FIGS. 5A and 5B illustrate exemplary data frame timing over the network.

FIGS. 6A and 6B illustrate an example of how messages and acknowledgements can be communicated.

FIGS. 7A and 7B illustrate an example of how nodes can arbitrate for network bandwidth.

FIGS. 8A and 8B illustrate an example of low and high priority messages communicated at the same time.

FIGS. 9A and 9B illustrate an example of how messages can be broadcast to all nodes.

FIGS. 10A and 10B illustrate an example of how nodes can be assigned addresses based on location in a ring.

FIGS. 11A and 11B illustrate an example of how nodes can be assigned addresses based on location in a daisy chain.

FIGS. 12A, 12B, and 12C illustrate exemplary hierarchical network architecture, bridge node architecture, and hierarchical addressing scheme respectively.

FIGS. 13A and 13B illustrate exemplary initialization state machines for timing master nodes and non-timing master nodes respectively.

FIG. 14 illustrates an exemplary digital PLL block diagram.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT(S)

Turning now to the drawings, FIG. 1A illustrates a group of nodes 11, 12, 13, and 14 connected in a ring topology by communication links 15, 16, 17, and 18. Each node has at least two ports illustrated by ports 19 and 20 on node 11 and ports 21 and 22 on node 12, which can communicate data in both directions. Node 11 in this example is defined as the timing master (TM), which repetitively sends a data frame around the ring in alternating directions. A first data frame travels from port 20 clockwise around the ring to port 19. After the complete data frame is received at port 19, the next data frame is sent from port 19 counter clockwise around the ring to port 20. Successive data frames continue alternating in direction, which allows all nodes to communicate with each other. The communication links preferably use plastic optical fiber (POF), but could use a wide variety of communication media including twisted pair wire or coaxial cable for instance.

FIG. 1B illustrates the resulting daisy chain topology when communication link 15 fails, is removed, or does not exist. In this daisy chain configuration, the timing master node 11 transmits a first data frame from port 19 through the chain to node 12. After node 12 receives the complete data frame, node 12 sends the next data frame in the opposite direction through the daisy chain to node 11. Successive frames continue to be sent back and forth, which allows all nodes to communicate with each other.

The network timing master is preferably specified by the user or can be automatically determined. The master may require more resources such as memory or processor speed than other nodes, so to reduce system cost only one or two nodes need be capable of being a timing master. A variety of mechanisms to automatically determine the timing master can be used, including each node capable of being a master generating a random number and the node with the highest number becomes the timing master. Once a timing master has been determined, this information could be stored in non-volatile memory.

FIG. 2 illustrates an exemplary block diagram of a node for a network using POF that includes network controller 30, application processor 36, fiber optic interfaces 31 and 32, and POF fiber 33 and 34. The fiber optic interfaces 31 and 32 perform the electro-optical conversion and may include just the LEDs 50 and 51, respectively. The network controller 30 includes two LED drivers 37 and 39, two LED receivers 38 and 40, digital phase locked loop (DPLL) 42, network interface logic 41, transmit and receive message buffers 43 and 44, and application interface logic 45.

The DPLL recovers the clock signal 48 from the received data signals 46 and 47, and forwards clock signal 48 to the network interface logic 41 and the rest of the network controller 30 (which may be implemented on a single integrated circuit "chip.") The clock signal 48, among other things, synchronizes the transmit data to the receive data, which can provide for all the nodes in network 10 to be synchronous to each other. The clock signal 48 can have the exact same frequency in all nodes, which allows data to flow smoothly back and forth through the network 10, and allows all nodes to keep track of time precisely relative to one another.

The DPLL 42 can use a high speed clock derived from the crystal oscillator 35 by a clock multiplying analog PLL. The DPLL 42 may include well-known digital phase detector, loop filter, and discrete time oscillator circuits. The phase detector should measure the time between transitions of the data signal 46 or 47 and the recovered clock signal 48, and forward a scaled version of this time to the loop filter after a measurement is made. The loop filter sums a proportional and integrated version of this time measurement to produce the input to the discrete time oscillator, which produces the recovered clock signal 48. The DPLL loop should have negative feedback, which forces the time measurement between data signal 46 or 47 edges and the recovered clock signal 48 to roughly zero.

The optical data sent through the POF is preferably encoded and/or scrambled in such a way to produce a sufficiently high transition density for the DPLL 42 to lock to. A variety of coding schemes including the well known biphase, miller, 4b5b, or 8b10b coding, or the proprietary DC adaptive (DCA) coding for MOST® networks could be used. The data frame preferably begins with a high transition density sequence or code that the DPLL can lock quickly to. The DPLL preferably has a relatively high bandwidth produced by a relatively large proportional coefficient to lock quickly to the start code. The DPLL also preferably has a relatively small integral coefficient to minimize phase drift during times when not data is being received.

The network interface logic 41 contains all the hardware necessary to produce data frames in the ring timing master and the daisy chain end points, and to forward data frames received on one port to the other port for transmission for all other nodes. The network interface logic 41 also performs all the low level functionality associated with acknowledging receipt of messages, arbitrating for data frames, and checking for data frame errors. The node address to which a message is sent, the message length, and the actual message come from the application through the transmit buffer 43, but the network interface logic 41 properly inserts this information into the data frame. Likewise, the network interface logic 41 monitors the address field of incoming data frames and forwards the address, message length, and message data of selected data frames to the receive buffer 44. Finally, the network interface logic 41 responds appropriately to certain system commands, such as node discovery.

The transmit buffer 43 and receive buffer 44 are preferably FIFO memories that contain one or more messages to be sent or have been received. The FIFO memories are preferably implemented using random access memory (RAM) and read and write pointers, although other types of FIFO memories may also be used. The information preferably stored in RAM includes the message length, the address, and the message data. The first data that the application interface writes to the transmit buffer 43 and reads from the receive buffer 44 is the message length. Likewise, the first data that the network interface logic 41 reads from the transmit buffer 43 and writes to the receive buffer is the message length. The RAMs are read or written a number of times equal to the value of "length" to transfer a complete message between blocks.

The application interface logic 45 allows an application processor 36 to access the transmit buffer 43 and receive buffer 44, and to configure and manage the network controller 30. The application interface logic 45 can be a simple memory mapped parallel interface that includes a memory address, memory data, and read and write signals, or it could be complete microcontroller that provides a smart interface between the application and the network, or any number of other suitable structures.

The application processor 36 is typically a microcontroller that is performing some function, such as controlling a motor, and managing the interface between that function and other nodes and functions in the network. Some network related tasks that the application processor 36 may do include discovering the network address of the human machine interface (HMI) that is controlling the motor and helping the HMI discover the motor node's network address. Others may include managing the network interface controller 30, buffering additional transmit and receive messages, and performing diagnostics.

FIG. 2 is just one example or many possible block diagrams for a network node. First, the network could use a different transmission media such as twisted pair wire, which would have a completely different physical interface. Second, clock and data recovery could be performed with a variety of different hardware including an analog PLL or simple oversampling circuitry. The network interface logic could be more or less complex depending on the nature of the data frame used and the capabilities of the application processor for instance. Functions such as message acknowledgement and error checking are useful but not necessary. Also, message lengths could be fixed, so that no length field would be necessary. Message buffers may or may not be necessary depending of the network speed and the application processor bandwidth. Finally, the application processor 36 may or may not be necessary. For instance, if the network controller 30 was intelligent enough, no application processor would be needed.

FIG. 3 is an illustration of an exemplary bi-directional physical layer interface for POF, which includes the fiber optic interface 31, the LED driver 37, and the LED receiver 38. The fiber optic interface 31 preferably contains just an LED and provides the physical connection to the POF. The network controller 30 preferably includes the LED driver 37 and the LED receiver 38. The LED cathode is preferably connected to ground and the LED anode is preferably connected to the LED driver 37 and the low pass filter (i.e., the resistor 59 and capacitor 60 in the LED receiver 38). The bottom plate of capacitor 60 is preferably connected directly to the LED cathode to prevent any stray ground currents from affecting the receiver.

The LED driver 37 includes a current mirror made from p-channel devices 63 and 64. P-channel devices 53 and 57 in conjunction with inverter 65 and control signal 58 allow the LED driver 37 to be turned on and off. When the transmit data signal 52 is low, the current from current source 54 is mirrored through device 64 to device 63 to produce the current through LED 50. When the transmit data signal 52 is high, the n-channel switch 56 is conducting and the sum of the current from current sources 54 and 55 is mirrored to the LED 50. The ratio of the currents from current sources 55 and 54 is preferably about 10 to 1 respectively to produce roughly a 10 dB extinction ratio in the transmitted light.

The LED receiver 38 includes the low pass filter from resistor 59 and capacitor 60 and the comparator 61. The LED 50 anode is connector to one terminal of the comparator 61 and the low pass filtered version of the LED 50 anode is connected to the other terminal. When light hits LED 50, the anode voltage rises, which forward biases LED 50. The anode voltage rises until the light induced current matches the diode forward current. When more or less light hits LED 50, the anode voltage goes up or down respectively. The DC component of this varying anode voltage is compared to the anode voltage to produce the received data signal 46.

The receiver bandwidth is determined by the dynamic capacitance of LED 50 and the resistance of resistor 59. Assuming a target bit rate of 1 million bits per second (1 Mbps) and a dynamic capacitance range of 10-20 pF, the resistance of resistor 59 is preferably in the range of 25 k to 12.5 k ohms respectively. The low pass filter cutoff for the combination of resistor 59 and capacitor 60 could be roughly 70 kHz, which puts the capacitance of capacitor 60 in the range of 100 to 200 pF. Assuming an average LED current of 0.2 µA at the sensitivity limit, the voltage across resistor 59 will be plus or minus 2.5 to 1.25 mV for resistor 59 resistances of 25 k to 12.5 k respectively. The design of comparator 61 preferably minimizes input offset voltages through device sizing and layout, and auto-zeroing techniques.

From a performance perspective, receiver 38 preferably includes an analog to digital converter that samples the low pass filtered version of the anode voltage at the end of a data frame and forwards the result to a digital to analog (D/A) converter that controls the negative terminal of comparator 61. During times when receiver 38 is not receiving data, the low pass filtered version of the anode will change, however, the D/A converter output will not. This minimizes the length of the data frame start sequence necessary to stabilize the receiver 38. Alternatively, the same function could be performed by an analog sample and hold circuit.

The physical layer interface illustrated in FIG. 3 is just one of many possible implementations. The LED driver and receiver circuitry could reside in the fiber optic interface 31 or as discrete circuits. The implementation of the driver 37 could be substantially different, such as a simple voltage source and a series resistance or complex calibrated temperature compensated current sources with peaking circuits to increase driver bandwidth. The configuration shown operates LED 50 in photovoltaic mode to optimize sensitivity, however, the receiver could configure LED 50 to operate in photoconductive mode to optimize bandwidth. Even in photovoltaic mode, there are many possible LED circuit configurations such as AC coupling instead of DC coupling. At additional cost, fiber optic interface 31 could include both an LED and silicon photodiode. Some circuitry to isolate the receiver 38 from the driver 37 power supply also may be desired. The example data rate and resulting component values is just one of many possibilities. Other suitable cost effective optical transceivers are further described in U.S. Provisional Application No. 61/094,595 filed Sep. 5, 2008 by David J. Knapp and entitled "Optical Communication Device, Method and System," the disclosure of which is incorporated herein by reference in its entirety. Such low cost optical transceivers enable this new networking technology to be cost effective using optical interconnect.

FIG. 4 illustrates an exemplary data frame format that includes a start field 71, message status field (i.e., "acknowledge field") 72, arbitration field 73, message length field 74, address field 75, message data field 76, and a CRC checksum field 77. The start field 71 provides a sequence to a receiving node that allows the receiver 38 to stabilize, the DPLL 42 to phase lock, and the network interface logic 41 to synchronize. The start field 71 preferably includes a series of alternating ones and zeros that is long enough for LED 50 low pass filter to reach its dc operating point and for the phase of the recovered clock signal 48 to move in phase with received data transitions. The length of the start series depends on the receiver 38 architecture and parameters, and the DPLL bandwidth. The start field preferably ends with a certain pattern that the network interface logic 41 can identify and synchronize to (i.e., a "frame alignment" marker or pattern).

The message status field 72 allows a node that properly received a message to confirm receipt with the sender (or provide any of several message status symbols, such as those described herein). A node receives a message on a data frame going one direction around the ring or through the daisy chain and sends an acknowledgement (e.g., an acknowledge symbol) in the next data frame going in the opposite direction. If the receiving node does not properly receive a message, the receiving node sends an error symbol (e.g., an error code) in the message status field 72 identifying what went wrong. For instance, bit errors in the message could have occurred during transmission that caused the CRC check to fail or the receiving node could not accept the message due to a full receive buffer.

The message status field 72 can be broken into two sub-fields for messages broadcast to all nodes or multi-cast to a group of nodes. One sub-field can be used for nodes that properly receive such a message and the other field can be used by other nodes that fail to receive the message properly. With these two sub-fields a sending node can know if no nodes, some nodes, or all nodes properly received the message.

The arbitration field 73 allows messages with higher priority to be sent before messages with lower priority. Similar to other networks such as MOST, the priority indicator (e.g., priority code) can be an un-signed integer sent most significant bit (MSB) first in the arbitration field 73. A node arbitrating for a data frame compares the received arbitration value one bit at a time with the priority symbol of the message to be sent. If the MSB received is a one and the MSB of the message to be sent is a zero, the node loses arbitration and waits until the next data frame to arbitrate again. If the received MSB is a zero and the MSB of the message to be sent is a one, the node wins arbitration, inserts the priority symbol of the message to be sent into the arbitration field 73, and sends the new message (thus preempting the received message). If both MSBs are zero, the receiving node continues to compare the next sets of bits until they do not match.

If a data frame does not contain a message, the value in the arbitration field 73 will be zero. Since the lowest priority message is preferably all zeros with a one as the least significant bit (LSB), such a message will be sent since the LSB of the message to be sent will be greater than the LSB of the received arbitration value. If a node loses arbitration because the priority of the message to be sent is not greater than the received priority, the priority of the message to be sent can be incremented each time arbitration is lost. This prevents low priority messages from being completely blocked from the network by high priority traffic.

The message length field 74 can specify the length of the following address 75 and data 76 fields. In single ring or daisy chain networks the length of the address field is preferably constant, so the message length, for example, may simply be the length of the data field plus one byte (e.g., for a one-byte address). In hierarchical networks, the address field can grow by the number hierarchical layers, in which case the length field 74 is preferably sub-divided into an address length field and a data length field. The length of any data frame is preferably larger than some minimum and smaller than some maximum, such as between 8 and 256 bytes of address and data, but other data frame sizes are also contemplated.

The address field 75 specifies the destination address for a message sent to a particular node, group of nodes, or all nodes. Similar to other networks such as MOST, the address can refer to a destination node's particular location in the network relative to the timing master, or can be some other unique address assigned to a node. The address field should have sufficient number of bits to uniquely identify all nodes in the ring or daisy chain with all the different types of addressing. With a maximum of 64 nodes, 6 bits can be used for the node address and 2 bits can specify node location addressing, assigned addressing, group addressing, or a broadcast address for a total of one byte.

A hierarchical network can be formed by bridges between the ring or daisy chain networks. Such bridges preferably contain two network controllers and four ports to connect to two ring or daisy chain networks. More network controllers with more ports can bridge to more networks. A hierarchical network has one root timing master connected to nodes in the root network. If one of the nodes in the root network is a bridge to a subnet, the second network controller is the timing master for the subnet. Subnets could have attached bridges to further subnets.

Messages sent from one ring or daisy chain to another ring or daisy chain could be sent through the bridge by using hierarchical addressing, which extends addresses much like a computer directory structure. To go up in the hierarchy, the first address in the address chain is that of the local timing master. To go up another layer, the timing master of the network attached to the local timing master is addressed. To go down into subnets, the bridge to the subnet is addressed, followed by the address of the node or bridge in the subnet. The length field 74 could identify the number of addresses in the address field 75 to move through the hierarchy. (See FIGS. 12A, 12B, and 12C and the accompanying text for additional description.)

The CRC checksum field 77 could provide error protection for a message in the current data frame. The network controller 30 in the sending node computes the checksum for the length field 74, the address field 75, and the data field 75, and sends the result in the CRC field 77. Any receiving node computes another checksum for the same fields and compares the result with the value in the received CRC field 77. If they are the same, the message has been received properly, although the message may still be rejected by a full receive buffer, and if they are different, the message incurred some bit errors and is rejected. If rejected, the message is not stored in the received buffer and the sender is notified through the message status field 72 of the next frame that the checksum failed and the message was rejected.

The data frame format described in FIG. 4 is just one example of many different data frame formats. Fields such as acknowledge 72, arbitration 73, length 74, and CRC 77 may or may not be necessary, or such fields could have functionality substantially different from what is described. Likewise, the address field 75 could be substantially different from what is described. Message reception could be acknowledged at higher level in a protocol if at all. Arbitration could be performed in a different manner or at a higher level in the protocol for instance. The message length is not necessary if the length is embedded in the data or if all messages have the same length. The data frame format described is appropriate for automotive applications, but could be substantially different for other applications.

FIG. 5A illustrates the data frame timing for the ring network illustrated in FIG. 1A. Data frame 0 is first shown traveling from the timing master 11 to node 12 and existing on communication link 15 for time T1. Assuming a data rate of 1 Mbps and 16 to 256 bytes per data frame, T1 could be anywhere from 128 microseconds to 2048 microseconds. A time T2 after data frame 0 starts on communication link 15, node 12 begins to transmit data frame 0 to node 13 on communication link 16. Time T2 consists of the travel time through communication link 15 and the network controller 30 delay on node 12. Assuming the speed of light through POF is 2×10^8 meter/second and the fiber length is a maximum of 15 meters, the delay through the POF is 75 nsec. The driver delay in the timing master 11 and the LED receiver and data recovery delay in node 12 total roughly one bit period or 1 microsecond. The network interface logic 41 preferably manages the acknowledge 72 and arbitration 73 fields on a per bit basis, and provided a high speed clock is available, the delay is preferably short, such as 25 nsec. The total delay for T2 could then be 1.1 microseconds.

The data frame 0 is forwarded around the ring through communication link 17 to node 14 and then through communication link 18 to port 19 of the timing master 11. After time T3, the timing master 11 begins transmitting data frame 1 through port 19 and communication link 18 to node 14. Time T3 is determined by the time the network interface logic 41 takes to identify the end of a data frame, which can be roughly a few bit periods or a few microseconds. Data frame 1 continues in the opposite direction around the ring back to port 20 of timing master 11.

The time T4 from when timing master 11 port 20 finishes transmitting data frame 0 until data frame 1 arrives back at timing master 11 port 20 is equal to 6 times T2 plus T3 or about 7.6 microseconds. In a general sense, time T4 is the total number of nodes minus one, times twice T2, plus T3 [((nodes−1)*2*T2)+T3]=T4. Assuming the maximum number of nodes in the network is 64, the maximum value to T4 is about 140 microseconds. Since T4 occurs once every two data frames, and since (as mentioned previously) T1 can vary from about 128 microseconds to 2048 microseconds, T4 reduces network throughput, to about 65% for minimum sized data frames, and to about 97% for maximum sized data frames. Of course for smaller networks, T4 is almost proportionately smaller and the network efficiency is higher.

FIG. 5B illustrates the data frame timing for the daisy chain network illustrated in FIG. 1B. The timing is similar to that of the ring network except that the data frame bounces back and forth between the daisy chain end points, nodes 11 and 12. The times T1, T2, and T3 are the same as for the ring network, however, time T4 is slightly shorter for the daisy chain since communication link 15 does not exist. T4 is two T2 time periods shorter for the daisy chain than for the ring.

The times T1 through T4 and the explanations associated with them are just one example of many possibilities. The data frame bit length and bit rate can be substantially different, which can change T1 dramatically. The propagation delay through the communication link could be substantially different if for instance the communication link was miles of long haul glass fiber or short interconnect on a printed circuit board. The delay through the network interface logic 41 could be substantially different if different priority or acknowledge schemes are used, which could change T2 significantly.

FIG. 6A illustrates an example of a message 1 being sent from node 14 to node 12. Node 14 first sends the message in the wrong direction (i.e., to node 11), which never reaches node 12, and then again in the next data frame, which does reach node 12. Node 12 then sends an acknowledgement in the third data frame.

FIG. 6B illustrates the data frame and message timing associated with the example in FIG. 6A. In data frame 0, node 14 wins arbitration and inserts message 1 on communication link 18, which terminates at the timing master 11. In data frame 1, node 14 again wins arbitration and inserts message 1 on communication link 17 to node 13, which forwards data frame 1 containing message 1 to node 12 which successfully receives message 1. Node 12 can also forward message 1 to the timing master 11 on communication channel 15 where the data frame and message are terminated. In data frame 2, node 12 inserts an acknowledgement symbol into the message status field 72 on communication link 16 to node 13. Node 13 forwards data frame 2 unchanged to node 14 on communication link 17. Node 14 reads the acknowledgement symbol and clears the message status field 72 prior to forwarding data frame 2 to the timing master 11 on communication link 18.

In the FIG. 6 example, node 14 initially sends the message to node 12 in the wrong direction, which is unnecessary. Every node can learn from the direction of an acknowledgement the direction of every node in the ring or daisy chain and only send future messages in the proper direction. FIG. 6 is just an example of different possible message transfer timing. In particular, acknowledging receipt of a message can be done at a higher level in the protocol stack.

FIG. 7A illustrates an example of arbitration between a high priority and low priority message. Node 12 is trying to send a high priority message 2 to node 13 while timing master 11 is trying to send a low priority message 1 in the clockwise direction to node 14. FIG. 7B illustrates possible data frame and message timing for the example in FIG. 7A. In data frame 0, timing master 11 sends message 1 to node 12 through communication link 15. Node 12 replaces message 1 with its higher priority message 2 in data frame 0 and forwards to node 13 through communication link 16. Node 13 receives message 2 properly and can forward message 2 to nodes 14 and 11 through communication links 17 and 18, respectively.

During data frame 1, timing master 11 sends message 1 to node 14 through communication link 18. Node 14 receives message 1 properly and can forward message 1 to node 13. Node 13 can insert an acknowledgement into the acknowledge field 72 of data frame 1 and forward data frame 1 to node 12 through communication link 16. Node 12 receives the acknowledgement and clears the acknowledge field before forwarding data frame 0 to timing master 11 through communication link 15. During data frame 2, node 14 can insert an acknowledgement into the acknowledge field 72 and forward to timing master 11. As should be clear from the above description, node 12 (or another node) could again insert a message into data frame 2.

FIG. 8A illustrates another example of arbitration in which both the high and the low priority message are successfully communicated in the same data frame. Node 12 is sending a low priority message 1 to node 13 while node 13 is sending a high priority message 2 to node 14 in a data frame 0 traveling in the clockwise direction. FIG. 8B illustrates possible data frame and message timing for the example in FIG. 8A. Node 12 inserts the low priority message 1 into data frame 0 and forwards to node 13 through communication link 16. Node 13 successfully receives message 1 and wins arbitration to send high priority message 2. Node 13 inserts message 2 into data frame 0 and forwards to node 14 through communication link 17. Node 14 successfully receives message 2 and can forward message 2 to timing master 11 through communication link 18.

During data frame 1, which is traveling in the counterclockwise direction, node 14 forwards an acknowledgement to node 13 through communication link 17. Node 13 receives the acknowledgement for message 2 and forwards an acknowledgement for message 1 to node 12 through communication link 16. Node 12 receives the acknowledgement and clears the acknowledge field 72 before forwarding the data frame 1 to node 11 through communication link 15.

The example from FIGS. 8A and 8B describes how careful placement of nodes that communicate with each other frequently can increase the throughput of the network to greater than that of the raw bit rate of 1 Mbps for example.

The timing diagrams in FIGS. 6B, 7B, and 8B appear to indicate that length of all data frames and messages are the same, which may or may not be the case. If the message length is allowed to vary, so may the data frames. In this case, the timing master in a ring and the end points in a daisy chain send an empty data frame of sufficient size to carry the minimum sized message when the timing master or end point is not sending a message. A downstream node that receives the empty data frame and sends a large message will increase the size of the data frame. If a node further downstream wins arbitration and sends a higher priority message of shorter length, the node preferably appends zeros (or other "padding" information or technique) to the high priority message to keep the data frame from becoming shorter. If such a node shortened the data frame, the next frame may be reflected back before the node with the long low priority message has finished transmitting. Alternatively, if such a system includes nodes which buffer an entire data frame before forwarding the data frame, the new message length could be shorter than the original message length.

FIG. 9A illustrates another example of arbitration when one node is broadcasting a message to all nodes. When broadcasting a message, the message is preferably sent in data frames in each direction to guarantee that all nodes receive the message. If the broadcast message is blocked by a higher priority message as in this example, the node sending the higher priority message returns a not acknowledgement to the broadcasting node. A broadcasting node should receive a positive acknowledgement in data frames from both directions to be sure the message was sent properly. Multi-cast addressing should work the same way.

FIG. 9B illustrates an example of data frame timing for the example shown in FIG. 9A. During data frame 0, node 12 forwards the broadcast message 1 to node 13 through communication link 16. Node 13 successfully receives message 1 and wins arbitration to send the high priority message 2. Node 13 forwards message 2 to node 14 through communication link 17, which receives message 2 successfully and can forward message 2 to timing master 11.

Node 14 inserts an acknowledgement 2 into data frame 1, which is forwarded to node 13 through communication link 17. Node 13 successfully receives acknowledgement 2 from node 14 and inserts a not acknowledgement into data frame 1, because node 13 blocked the broadcast message 1 in the previous frame, which is forwarded to node 12 through communication link 16. Node 12 successfully receives the not acknowledgement, clears the acknowledge field 72, and sends the broadcast message 1 in data frame 1 through communication link 15 to timing master 11.

Timing master 11 successfully receives the broadcast message 1 and returns an acknowledgement 1 in data frame 2 to node 12 through communication link 15. Node 12 receives acknowledgement 1, clears the acknowledge field 72, and sends the broadcast message 1 in data frame 2 to nodes 13, 14, and 11 through communication links 16, 17, and 18 respectively. Timing master 11 ignores this second message 1.

Node 14 inserts an acknowledgement 1 for the broadcast message 1 into data frame 3, which is sent to node 13 through communication link 17. Node 13 inserts the same acknowledgement into data frame 3, which is sent to node 12 through communication link 16. Node 12 receives the acknowledgement 1 and clears the acknowledge field 72.

The example shown in FIGS. 9A and 9B illustrates the possibility of the timing master in a ring receiving the same message twice. To prevent this, the timing master preferably should only accept messages on one port at all times. The data frame, message, and acknowledgement timing shown in FIG. 9B is just one of many possibilities, which depend on the data frame format and the application among other things.

FIGS. 10A and 10B illustrate an exemplary method of assigning addresses to all nodes based on location within a ring. The timing master 11 broadcasts a special address discovery command in data frame 0, to which all nodes respond with a special acknowledgement in data frame 1. The timing master 11 has the zero location in the ring and sends a zero in the acknowledge field 72 of data frame 1 to node 14 through communication link 18. Node 14 receives the value zero, increments it to one, stores the one as its location address, and forwards a one in the acknowledge field 72 to node 13 through communication link 17. Node 13 likewise receives the value one, increments it to two, stores the two as its location address, and forwards a two in the acknowledge field 72 to node 12 through communication link 16. Node 12 again increments the acknowledge field to 3 and forwards to the timing master 11. The timing master 11 receives the value of 3 in the acknowledge field 72 and stores three as the number of additional nodes in the ring. After the discovery command, all nodes know their location in the ring relative to the timing master 11 and the timing master 11 knows the total number of nodes in the ring. Other fields and similar techniques may also be used for such an address discovery capability.

FIGS. 11A and 11B illustrate an exemplary method of and timing diagram for assigning addresses to all nodes based on location in a daisy chain. FIG. 11A shows communication link 16 removed. As shown in FIG. 11B, the timing master 11 first sends the discovery message in data frame 0 through communication links 18 and 17 to nodes 14 and 13. The endpoint, node 13 responds with a one in the acknowledge field 72 of data frame 1. Node 14 increments the acknowledge value to 2, which the timing master 11 receives and forwards with the discovery command to the other endpoint, node 12.

Node 12 increments the acknowledge field 72 to three and sends three in the acknowledge field 72 of data frame 2 back to the timing master 11. After the discovery command has been sent in both directions, all nodes have a unique location address and the timing master 11 knows the total number of nodes in the daisy chain.

FIGS. 10 and 11 are examples of many possible ways to assign unique addresses to network nodes. For example nodes could simply be assigned fixed unique addresses or nodes could generate random numbers and resolve any resulting conflicts. Assigning addresses based on location in the network could also be performed in a variety of ways.

FIG. 12A is an illustration of an exemplary hierarchical network with root net 100, layer 1 subnets 101 and 102, and layer 2 subnets 110, 111, 112, and 113. The root net 100 is connected to the layer 1 subnets 101 and 102 through bridge nodes 120 and 114 respectively. The layer 1 subnet 101 is connected is connected to the layer 2 subnets 110 and 110 through bridge nodes 121 and 122 respectively. The layer 1 subnet 102 is connected to the layer 2 subnets 112 and 113 through bridge nodes 123 and 124, respectively.

The hierarchical network has one root timing master 125 that determines the timing for the entire network. The bridge nodes 120 and 114 are the timing masters for the layer 1 subnets 101 and 102, and the bridge nodes 121, 122, 123, and 124 are the timing masters for the layer 2 subnets 110, 111, 112, and 113 respectively.

FIG. 12B is an exemplary block diagram of bridge node 114 with fiber optic interfaces 115 and 118 to the root net and fiber optic interfaces 116 and 117 to the layer 1 subnet 102. The exemplary bridge node 114 includes two network controllers 120 and 119, which communicate in the root net 100 and layer 1 subnet 102 respectively. A clock signal 126 from network controller 120 to the network controller 119 synchronizes the timing of the subnet to the root net. The network controllers 120 and 119 together with the application processor 127 manage the communication of messages between the rings (i.e., between the root net 100 and the layer 1 sub-net 102).

FIG. 12C illustrates an exemplary addressing scheme for messages passing through the hierarchy. The example shows the address field 75 of the data frames comprising a message sent from node 130 in layer 2 subnet 110 to node 131 in layer 2 subnet 112. The addressing scheme shown uses node location addressing, but could have used assigned addressing. The location addresses for all nodes are illustrated in FIG. 12A, and show that the address path from node 130 to 131 is through bridge node 121 with address 0x00, bridge node 120 with address 0x00, bridge node 114 with address 0x01, bridge node 123 with address 0x03 and finally to node 131 with address 0x02.

In this example, the data frame address field 75 for the message in layer 2 subnet 110 comprises a 5-byte sequence (0x00, 0x00, 0x01, 0x03, and 0x02) and the data frame length field 74 comprises a sub-field specifying the address field 75 length of 5 bytes. Nodes in the root net 100 or any subnet monitor only the first address byte of a data frame to receive a message. Therefore, the bridge node 121 with address 0x00, since it is the timing master, receives the message sent from node 130. The bridge node 121 removes the first address byte 0x00, reduces the address length sub-field to four, and transmits the message in layer 1 subnet 101. The bridge node 120 with address 0x00 receives the message since it is the timing master for subnet 101. Again bridge node 120 removes the first address byte 0x00, reduces the address length sub-field to three, and transmits the message in the root net to bridge node 114 with address 0x01. The same process repeats in bridge node 114 and 123 and the message is finally received by node 131 with address 0x02.

FIG. 12A is one example of many possible hierarchical networks. Such networks may be implemented with a variety of topologies, including all rings as shown, all daisy chains, or a variety of combinations of both topologies. There could be many more or fewer subnets or subnet layers for instance. The interfaces between networks could have more or less ports communicating to different subnets. For instance, a three port bridge could bridge between a ring and a daisy chain provided the bridge is an end point for the daisy chain. The bridge node block diagram in FIG. 12B is one example of many possibilities. For instance, the interfaces 115, 116, 117, and 118 could be isolation transformers for networks using coax cable instead of POF. Also, the functionality of the two network controllers 119 and 120 could be combined in some manner to optimize the implementation of a bridge node. The application processor may or may not be needed depending on the intelligence of the network controller functionality.

The addressing scheme illustrated in FIG. 12C is one of many different possibilities. For instance, all nodes in the hierarchy could be assigned unique addresses, the data frame address field could always include a unique single address, and bridges could forward all messages received on one subnet to the other subnet. This scheme would be less complex, but would increase network traffic. Such a scheme could be used in addition to the node location scheme described in FIG. 12C, which would facilitate broadcast and multi-cast messaging. Bridge nodes could also operate like Ethernet or internet routers, which remember the addresses of nodes on different ports, monitor the addressing of incoming messages, and forward them to the appropriate port.

FIGS. 13A and 13B illustrate example state diagrams for network start up procedures in a timing master, and nodes that are not timing masters, respectively. These diagrams assume that all nodes are powered and active at the beginning of the procedure. Systems that use some power save state when the system is not active are preferably brought up prior to starting the procedure shown in FIGS. 13A and 13B. If such a system is designed to allow any node to wake up the system, such a prior wakeup procedure may include a node transmitting a continuous signal from all ports for a certain amount of time sufficient to wakeup all nodes, and then turning the signal off. After an incoming signal on one port wakes up a node, the node can begin transmission from the other port to wake up downstream nodes. When the incoming signal on one port stops, the node stops transmission from the other port. A timing master then could wait a certain amount of time and then start the procedure illustrated in FIG. 13A.

The exemplary timing master start up procedure in a single ring or daisy chain begins in state S1 by sending an empty data frame from port A and then waiting in state S2 for some period of time. If the data frame is received on port B, the timing master sends another empty data from in state S3 from port B. If the data frame is received on port A, then the timing master enters the normal operating state S4 for a ring. If the data frame is not received on port A, the timing master enters the S5 error state.

Back to the top of FIG. 13A, if the timing master does not receive a data frame on port B, but is does on port A, then it sends another data frame on port B in state S6 and waits in state S7. If a data frame is then received on port B, the timing master enters the normal operating state S8 for a timing master somewhere in the middle of a daisy chain. If a data frame is not received on port B, the timing master enters the normal operating state S9 for a timing master at the end of a daisy chain with port A active.

Back again to near the top of FIG. 13A, if the timing master does not receive a data frame on port A or port B after sending a data frame on port A, the timing master sends a data frame from port B in state S10 and waits in state S11. If a data frame is received on port B, the timing master enters the normal operating state S12 for a timing master at the end of a daisy chain with port B active. If no data frame is received on port B, the timing master enters the S13 error state.

The exemplary start up procedure in FIG. 13B for nodes that are not timing masters begins with the node in state S20 waiting for data on either port. If the node detects data on port A, the node bypasses the data frame to port B in state S21, and then waits in state S22. If data is detected is detected on port B, the node enters the normal operating state S23 for a node that is not an end point or a timing master in a ring or daisy chain. If no data is detected on port B, the node enters the normal operating state S24 for an end point node that is not a timing master with port A active.

Back to the top of FIG. 13B, if the node detects data on port B, the node bypasses the data frame to port A in the state S25, and then waits in state S26. If data is detected on port A, the node enters the normal operating state S23 for a node that is not an end point or a timing master in a ring or daisy chain. If no data is detected on port A, the node enters the normal operating state S27 for an end point node that is not a timing master with port B active.

The exemplary state diagrams in FIGS. 13A and 13B illustrate possible procedures not only during start up but also after a failure of a communication link or node. If such a failure occurs, the network might go down momentarily and then begin to re-initialize. Following similar procedures as during start up, after a failure the network can re-configure as a daisy chain instead of a ring and operate normally again. For protection against a timing master failure, the ring could have a backup master that performs a startup procedure similar to the example in FIG. 13A some timeout period after the failing master should have re-initialized the network.

Other suitable techniques are also contemplated to detect a failure in a node or link. In a logical and physical ring configuration, if a link or node fails, then the timing master does not receive a data frame sent from one port back on the other port. The timing master knows something failed and can reinitialize the network (e.g., per the start up state machines described above). If necessary, the timing master could stop transmitting data frames once it determines there has been a fault. All other nodes could detect no incoming data frames for some period of time and shutdown. The timing master could then re-start the network according to the start up state machine.

If a link is intermittently faulty (i.e., producing coding or CRC errors), the receiving node can set some threshold of error rate and shut down the link if the threshold is exceeded. Shutting down the link means not forwarding a frame received on one port to the other port. Again, the timing master will not receive data frames sent from one port back on the other port and can reinitialize. In such an instance, the network may continue to be "connected" in a physical ring topology, but "configured" to operate in a logical daisy chain topology.

Re-configuring from a logical daisy chain back to a logical ring could be done in a number of ways. A particularly simple and robust way would be to wait until the system has been turned off and then back on by the user, and then just follow the normal startup procedure (e.g., re-initialize the next time the car is started).

To dynamically re-configure back to a logical ring topology, each end point could continually retransmit data frames received on its active to its inactive port. If an end point begins receiving data frames sent from its active port on its inactive port, the end point knows that the faulty node/link is now working properly. The end point can then stop transmitting anything. The timing master can detect stopped data frame traffic and reinitialize.

These startup and re-initialization procedures are just examples of many possible procedures. Other techniques may also be utilized. For example, a node could request a network re-start or re-configuration by inserting a special ACK symbol into a data frame, which is eventually received by the timing master and which then initiates a startup procedure.

FIG. 14 is an exemplary block diagram of DPLL 42 in FIG. 2. DPLL 42 receives the two data inputs from the two network controller 30 receive ports A and B, and produces a clock 48 that is synchronous with whichever port is active. The DPLL includes two discrete time oscillators DTO 161 and 162, which are used when processing phase information from port A received data 46 and port B received data 47 respectively. Although the bit rate of the received data from both ports is identical, the two DTOs 161 and 162 are useful since the phase of the received data signals 46 and 47 may be different. Without two DTOs, the probability of bit errors at least during the data frame start field 71 goes up. With two DTOs, the jitter on each individual DTO output is also minimized.

The received data signals 46 and 47 from port A and B respectively pass through multiplexer 150 based on the state of the enable port A control signal 49. Control signal 49 is high when the network controller 30 is receiving data on port A. Multiplexer 150 also passes data signal 46 from port A when control signal 49 is high. When control signal 49 is low, data signal 47 from port B passes through the multiplexer 150.

Phase detector 151 compares the time between rising edges, for instance, of clock 48 and the output of multiplexer 150. The phase detector produces two outputs. One output (i.e., signal 170) signals when a valid phase comparison has occurred and the other provides the phase difference. The phase difference is multiplied by the proportional and integral coefficients Kp 166 and Kc 167 with multipliers 152 and 153. The output of multiplier 153 is added to the previous integrator result stored in register 135 and the result is forwarded to adder 156, which sums the current integrator result from adder 154 with the proportional result from multiplier 152 to form the loop filter result. The loop filter result is multiplexed with the current integrator result by multiplexers 157 and 158 and forwarded to registers 159 and 160 respectively. When the control signal 49 is high, the loop filter result is forwarded to register 159 and the integrator result is forwarded to register 160. When signal 49 is low, the integrator result is forwarded to register 159 and the loop filter result is forwarded to register 160.

Each time a new phase comparison result is available at the output of the phase detector 151, the phase detector 151 also triggers a signal 170 that clocks the integrator accumulator register 155 and the DTO input registers 159 and 160. The updated values in registers 159 and 160 specify the frequencies of the clocks produced at the outputs of DTOs 161 and 162. Crystal oscillator 35 in combination with inverting amplifier 164 produce the clock input to the clock multiplying analog PLL 165. The high speed clock output from APLL 165 runs the DTOs 161 and 162.

The clock outputs from the DTOs 161 and 162 are connected to multiplexer 163, which in combination with the enable port A control signal 48a produce the clock signal 48 that is forwarded to the phase detector 151, the network interface logic 41, and possibly other parts of the network controller 30.

During normal operation, the clock signal 48 will be frequency locked and phase aligned with the data from the active port. Since the phase of the data from each port is different, the phase of clock signal 48 will shift accordingly producing systematic jitter with an amplitude equal to the phase difference between data received from the two ports and with a frequency equal to half the data frame rate. The clock output from each individual DTO, however, is precisely synchronous to the network bit rate and is free of this systematic jitter.

The number clocked into DTO register 159 or 160 after each valid phase detector comparison specifies the clock frequency produced by the DTO 161 or 162 respectively. This number is the sum of a scaled down version of the current phase comparison result from multiplier 152 and the integrator output. The integrator is the combination of adder 154 and register 155. The integrator low pass filters the input phase variations to produce the long term average frequency for the DTOs 161 and 162, and the multiplier 152 output provides information on the instantaneous phase variation on the output of multiplexer 150.

During times when neither received data signal 46 nor 47 is active, which occurs during T4 from FIGS. 5A and 5B, registers 159 and 160 are not updated and the DTOs 161 and 162 are free running. Any deviation in the value stored in register 159 or 160 from the long term average bit rate will cause the output phase of DTO 161 or 162 respectively to shift. If this phase shift is large enough, bit errors will occur at the beginning of the next data frame. Therefore, it is desirable for the integral coefficient Ki 167 to be small, which averages the input phase variation longer to produce a better estimate of the average bit rate, and possibly for the DTO input registers 159 and 160 to be updated with just the integrator result at the end of each received data frame. Therefore, phase detector 151 could produce a phase difference result of zero and at least one clock pulse to registers 159 and 160 after detecting no data input transitions for a period of time.

The necessary frequency resolution of DTOs 161 and 162 is determined by how long the DTO has to run without being updated with the loop filter result. Assuming the longest data frame size of 256 bytes and the largest network of 63 nodes with T4 of 140 microseconds, the total time is 2188 bit periods or 2188 microseconds. Assuming a tolerable phase shift of 10% of a bit period, the required frequency resolution is about 45 ppm. DTOs with 1 ppm frequency resolution are easily achievable which should be more than sufficient.

To ensure that the DPLL locks to the incoming data properly, the inverse of the loop bandwidth should be shorter than the shortest data frame, which is 128 bits or 128 microseconds. Therefore, the loop bandwidth is preferably about 10 Hz or higher while acquiring lock. During locking the DTO input register is preferably loaded with the loop filter result instead of the integrator result at the end of each data frame, since the integrator takes longer to settle.

For all nodes except those at the end of a daisy chain, the loop filter is updated at all times except between data frames such as during T4, which allows the DPLL to lock relatively quickly. However, a node at the end of a daisy chain only receives data from one port, so the time that the loop filter is not updated is substantially longer than other nodes, which may result in longer lock times.

The loop parameters, Kp 166 and Ki 167, are each preferably set to a different value during the locking process than during normal operation. The loop bandwidth and dominate pole frequency determined by Kp 166 and Ki 167 can initially be set to relatively high values that allow the loop to lock and the integrator to stabilize quickly. Once the loop has locked and stabilized, Kp 166 and Ki 167 can be reduced to provide better input jitter rejection and less sensitivity to DTO phase drift during times when the DTO is free running.

In a ring topology, the timing master alternately produces a data frame on one port and terminates the data frame on the other port. The timing master in a ring or as an end point in a daisy chain does not pass data from one port to the other. A timing master that is not an end point in a daisy chain, however, should pass data received on one port to the other port from transmission. In order to do this and to still provide the reference clock for the network bit rate, the network interface logic in the timing master preferably includes a small FIFO memory of perhaps one or two bits to buffer received data prior to retransmission. This provides enough of a timing buffer to account for a received signal that is marginally "too fast" relative to the reference clock of the timing master node, without overrunning the buffer and risking the loss of one or more bits of data in the frame.

The block diagram and description of the DPLL in FIG. 14 is just an example of many possible clock recovery circuits. For instance two independent digital or analog PLLs could be dedicated to each receive port. Alternatively, data could be recovered using some over-sampling technique, which may not require any PLL.

The network hardware and protocol described in FIGS. 2 through 14 describe an example implementation of the invention. Many other, physical layer, node hardware, and data frame implementations are possible. The invention could use any communication medium capable of transporting data in both directions, such as twisted pair wire or coaxial cable. In addition, many of the inventive concepts described herein may be utilized in an alternative system embodiment providing a pair of unidirectional communication links between each pair of nodes, such as two twisted pairs, two POF links, or two coaxial cables. The physical layer node hardware would be substantially different for different possible communication medium. The network controller function interfacing to the physical layer could be implemented in a wide of ways. More or less circuitry could be implemented in hardware depending on the speed of the network and the capabilities of the process technology for instance. The functionality of the network controller depends strongly on the definition of the data frame. As used herein, a single-channel bi-directional communication link includes at least a single fiber, a single twisted pair, and a single coaxial cable.

Protocols, such as 1000BaseT and HDSL, support simultaneous bi-directional communication across a single transmission channel, such as one twisted pair, with fairly sophisticated analog and digital signal processing. Such circuitry has a driver with a certain output impedance that matches the transmission line characteristic impedance and a receiver that captures the signal on the transmission line, which is equal to the sum of the transmitted data signal and received data signal. Inside the transceiver, a replicated version of the transmitted signal is subtracted from the captured transmission line signal. The result is the received data signal, which is further processed to recover a clock and ultimately the received data. In certain embodiments, a system can use such simultaneous bi-directional communication channels to double the network bandwidth by sending a respective data frame simultaneously in each direction around a ring or through a daisy chain. A useful restriction may be that all data frames need to be the same length.

The data frame described in FIG. 4 is a very specific implementation of the invention, which is intended to compete with CAN. Any number of protocols for communicating packets could be implemented that have varying bit rates, packet lengths, and addressing capabilities. For instance, Ethernet or Internet Protocol packets could be transported. Features such as acknowledgement, arbitration, and error checking may or may not be desirable depending on the protocol and application. The data frames do not even need to communicate packets. Each data frame could be a time division multiplexed set of data streams for instance. Each stream could be allocated a certain amount of bandwidth into which a source forwards raw data, such as samples from an analog to digital converter. Any destination could read out the raw data from any selected stream and send it to a digital to analog converter for instance.

A network using the invention could also communicate both packets and raw data streams, by using one or more channels of a time division multiplexed stream as a packet channel. Packets could be sent in one or more timeslots and streams could be sent in others. Complete packets could be sent in a frame or packets could accumulate over multiple frames. Such an implementation of the invention could compete with FlexRay.

As used herein, synchronized bit timing need not imply zero phase delay between the two timing signals (e.g., clocks), but rather synchronized in frequency. A next available data frame may correspond to the next data frame, may correspond to the next data frame for which the message can win arbitration, and may also correspond to such a data frame traveling in the "correct" direction toward the destination node.

While circuits and physical structures are generally presumed, it is well recognized that in modem electronic design and fabrication, physical structures and circuits may be embodied in computer readable descriptive form suitable for use in subsequent design, test or fabrication stages as well as in resultant fabricated electronic circuits. Accordingly, claims directed to traditional circuits or structures may, consistent with particular language thereof, read upon computer readable encodings and representations of same, whether embodied in media or combined with suitable reader facilities to allow fabrication, test, or design refinement of the corresponding circuits and/or structures. The invention is contemplated to include circuits, related methods or operation, related methods for making such circuits, and computer-readable medium encodings of such circuits and methods, all as described herein, and as defined in the appended claims. As used herein, a computer-readable medium may include a storage medium such as a disk, tape, or other magnetic, optical, semiconductor (e.g., flash memory cards, ROM), or electronic medium. An encoding of a circuit or system may include circuit schematic information, physical layout information, behavioral simulation information, and/or may include any other encoding from which the circuit may be represented or communicated.

The foregoing details description has described only a few of the many possible implementations of the present invention. For this reason, this detailed description is intended by way of illustration, and not by way of limitations. Numerous variations and modifications of the embodiments disclosed herein will become apparent to those skilled in the art once the above disclosure is fully appreciated, without departing from the scope and spirit of the invention. It is intended that the following claims be interpreted to embrace all such variations and modifications. Moreover, the inventive concepts incorporated into the embodiments described above are specifically contemplated to be used alone as well as in various combinations. Accordingly, other embodiments, variations, and improvements not described herein are not necessarily excluded from the scope of the invention. It is only the following claims, including all equivalents, that are intended to define the scope of this invention.

What is claimed is:

1. A method for use in a network node within an interconnected network of nodes, said method comprising:
    forwarding data frames received on a first bi-directional port of the network node to a second bi-directional port of the network node for outbound transmission on the second bi-directional port;
    forwarding data frames received on the second bi-directional port to the first bi-directional port for outbound transmission on the first bi-directional port, wherein the first and second ports comprise single-channel bi-directional ports;
    if a data frame received on a given bi-directional port includes a message addressed to the network node, then inserting a message status symbol into the next data frame transmitted outbound on the given bi-directional port; and
    assigning an address for the network node in response to a received data frame which includes an address discovery command, wherein assigning comprises:
        incrementing an address conveyed in the address discovery command data frame;
        storing the incremented address as the network node address; and
        forwarding the address discovery command with the incremented address in the next transmitted data frame.

2. The method as recited in claim 1, wherein the first and second ports each comprise an optical fiber port.

3. The method as recited in claim 1 further comprising synchronizing bit timing of data frames transmitted on one port to bit timing of data frames received on the other port.

4. The method as recited in claim 1 further comprising re-timing transmission of outbound data frames to an internal timing reference of the network node.

5. A method for use in a network node within an interconnected network of nodes, said method comprising:
    forwarding data frames received on a first bi-directional port of the network node to a second bi-directional port of the network node for outbound transmission on the second bi-directional port;
    forwarding data frames received on the second bi-directional port to the first bi-directional port for outbound transmission on the first bi-directional port, wherein the first and second ports comprise single-channel bi-directional ports; and
    if a data frame received on a given bi-directional port includes a message addressed to the network node, then inserting a message status symbol into a forwarded data frame received on the other port of the network node, and transmitted outbound on the given bi-directional port.

6. The method as recited in claim 1 wherein the message status symbol comprises an acknowledge symbol (ACK) if the message was received without errors by the network node, and comprises an error symbol (ERC) if the message was received by the network node but contained one or more errors.

7. The method as recited in claim 5 further comprising:
    inserting, into a data frame received on one port, a new message for outbound transmission of the data frame including the new message on the other port.

8. The method as recited in claim 7 further comprising:
if the new message comprises a broadcast message, inserting the broadcast message into a second data frame received on the other port, for outbound transmission of the second data frame including the broadcast message on the one port.

9. The method as recited in claim 7 further comprising:
arbitrating the relative priority of the new message and any existing message carried by the data frame received on the one port; and
if the new message wins arbitration, inserting the new message into the data frame and preempting the existing message, for outbound transmission of the data frame including the new message on the other port.

10. The method as recited in claim 9 wherein:
the arbitrating is performed bit-serially, and a new priority indicator inserted as soon as the network node wins the arbitration.

11. The method as recited in claim 9 wherein:
if the new message is shorter than the preempted message, padding the new message to the length of the preempted message.

12. The method as recited in claim 9 wherein:
if the preempted message is a broadcast message, inserting a negative acknowledge (NOT ACK) message status symbol in next frame transmitted outbound on the port which received the data frame containing the preempted broadcast message.

13. The method as recited in claim 9 wherein:
if the new message loses arbitration and is not inserted into the data frame, queuing the new message for retransmission in a subsequent data frame and increasing the priority of the new message to increase likelihood of winning a subsequent arbitration.

14. The method as recited in claim 7 further comprising:
if the next data frame received on the other port includes an ACK symbol, removing the ACK symbol from said next data frame before forwarding to the one port; and
if the next data frame received on the other port does not include an ACK symbol, queuing the new message for retransmission in the next available data frame.

15. The method as recited in claim 7 further comprising:
maintaining a table of network node addresses reachable by a data frame transmitted on each respective port; and
sending a message to a destination node only in a data frame transmitted on the corresponding port.

16. The method as recited in claim 1 further comprising:
triggering a network topology reconfiguration after a certain period of inbound inactivity on a previously active port.

17. The method as recited in claim 7 wherein each data frame comprises an arbitration field, an address field, a data field, a message status field, and a CRC checksum field.

18. The method as recited in claim 17 wherein each data frame further comprises:
a start sequence including a plurality of bit transitions for synchronizing an internal reference clock of the network node receiving the data frame.

19. The method as recited in claim 17 wherein the arbitration field conveys a priority value for indicating the priority of the message included within the data frame, and when such priority value is a predetermined value in its range, for indicating that the data frame is empty and thus does not include a message.

20. The method as recited in claim 1 wherein the network node is configured to operate as a timing master node, and wherein the method further comprises:
arbitrating with other devices which are likewise configurable to operate as a timing master node, to determine whether the network node will operate as the timing master node for the network if the other devices are not configured to operate as the timing master node.

21. The method as recited in claim 1 further comprising:
forwarding data frames received on a third bi-directional port of the network node to a fourth bi-directional port of the network node for outbound transmission on the fourth bi-directional port;
forwarding data frames received on the fourth bi-directional port to the third bi-directional port for outbound transmission on the third bi-directional port; and
if a data frame received on one of the first and second bi-directional ports addresses a network node reachable from the third or fourth ports, forwarding the data frame to said third or fourth port.

* * * * *